(12) United States Patent
Dudar et al.

(10) Patent No.: US 9,829,370 B2
(45) Date of Patent: Nov. 28, 2017

(54) METHODS AND SYSTEMS FOR FUEL LEVEL INDICATORS IN A SADDLE FUEL TANK

(71) Applicant: Ford Global Technologies, LLC, Dearborn, MI (US)

(72) Inventors: Aed M. Dudar, Canton, MI (US); John Mullins, Belleville, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 212 days.

(21) Appl. No.: 14/697,172

(22) Filed: Apr. 27, 2015

(65) Prior Publication Data

US 2016/0313171 A1    Oct. 27, 2016

(51) Int. Cl.
| F02M 37/00 | (2006.01) |
| G01F 25/00 | (2006.01) |
| G01F 23/32 | (2006.01) |

(52) U.S. Cl.
CPC ......... G01F 23/32 (2013.01); F02M 37/0094 (2013.01)

(58) Field of Classification Search
CPC ............ F02M 37/0088; F02M 37/0094; G01F 25/0061; G01F 23/30; G01F 22/02; G01F 23/00; G01F 25/0084; G02M 37/0094
See application file for complete search history.

(56) References Cited

U.S. PATENT DOCUMENTS

| 4,773,260 A * | 9/1988 | Ohno ................ F02M 37/0094 340/450.2 |
| 5,637,788 A | 6/1997 | Remboski et al. |
| 5,765,121 A | 6/1998 | Schwager et al. |
| 5,983,932 A * | 11/1999 | Wagner ................ B60K 15/03 123/509 |
| 6,269,803 B1 | 8/2001 | Corkill |
| 6,283,142 B1 * | 9/2001 | Wheeler ............ F02M 37/0094 123/509 |
| 6,374,663 B1 | 4/2002 | Müller |
| 6,607,005 B2 * | 8/2003 | Viebahn ............... B60K 15/077 123/510 |
| 6,659,122 B1 * | 12/2003 | Zahdeh .................. B60K 15/00 137/256 |
| 7,614,854 B2 | 11/2009 | Palvölgyi |
| 8,416,090 B2 | 4/2013 | Bucciero |
| 8,794,259 B2 * | 8/2014 | Daneshgari ............ B60K 15/03 137/263 |
| 9,086,040 B2 * | 7/2015 | Jentz .................. F02M 37/0088 |

(Continued)

OTHER PUBLICATIONS

Dudar, A., "System and Methods for Fuel Level Inference," U.S. Appl. No. 14/226,498, filed Mar. 26, 2014, 35 pages.

(Continued)

*Primary Examiner* — David A Rogers

(74) *Attorney, Agent, or Firm* — James Dottavio; McCoy Russell LLP

(57) ABSTRACT

Methods and systems are provided for diagnosing fuel level indicators in a saddle fuel tank. In one example, a method may include determining degradation of each of the first and the second fuel level indicators included in a first compartment and a second compartment of a saddle tank based on a correlation between changes in fuel tank pressure during the refueling event and an indication by the fuel level indicators of the first and the second compartment reaching full capacity.

3 Claims, 8 Drawing Sheets

(56) References Cited

U.S. PATENT DOCUMENTS

| | | | |
|---|---|---|---|
| 9,267,835 B2* | 2/2016 | Takahashi | F02D 41/222 |
| 9,546,894 B2* | 1/2017 | Dudar | G01F 23/18 |
| 9,618,381 B1* | 4/2017 | Dudar | G01F 25/0069 |
| 2007/0266762 A1* | 11/2007 | Rumpf | F02M 37/025 73/1.73 |
| 2008/0028851 A1* | 2/2008 | Moening | B60K 15/061 73/290 R |
| 2008/0245130 A1* | 10/2008 | Wang | G01F 25/0061 73/1.73 |
| 2010/0229966 A1* | 9/2010 | Elwart | F02M 25/0809 137/485 |
| 2010/0236638 A1* | 9/2010 | Streib | B60K 15/04 137/14 |
| 2011/0297260 A1 | 12/2011 | Mason | |
| 2014/0107906 A1* | 4/2014 | Jentz | F02M 37/0088 701/102 |
| 2014/0190246 A1* | 7/2014 | Guo | G01F 23/363 73/114.54 |
| 2014/0260576 A1 | 9/2014 | Sweppy et al. | |
| 2015/0285670 A1* | 10/2015 | Takahashi | F02D 41/222 73/1.73 |

OTHER PUBLICATIONS

Dudar, A. et al., "System and Methods for Determining Fuel Fill Level," U.S. Appl. No. 14/490,220, filed Sep. 18, 2014, 47 pages.

Anonymous, "An EVAP Leak Diagnostic Robustness Method for Saddle Tanks Interaction," IPCOM000233165D, Nov. 27, 2013, 2 pages.

Anonymous, "An EVAP Leak Diagnostic Robustness Method for Saddle Tanks Interaction," IPCOM No. 000233165, Published Nov. 27, 2013, 2 pages.

* cited by examiner

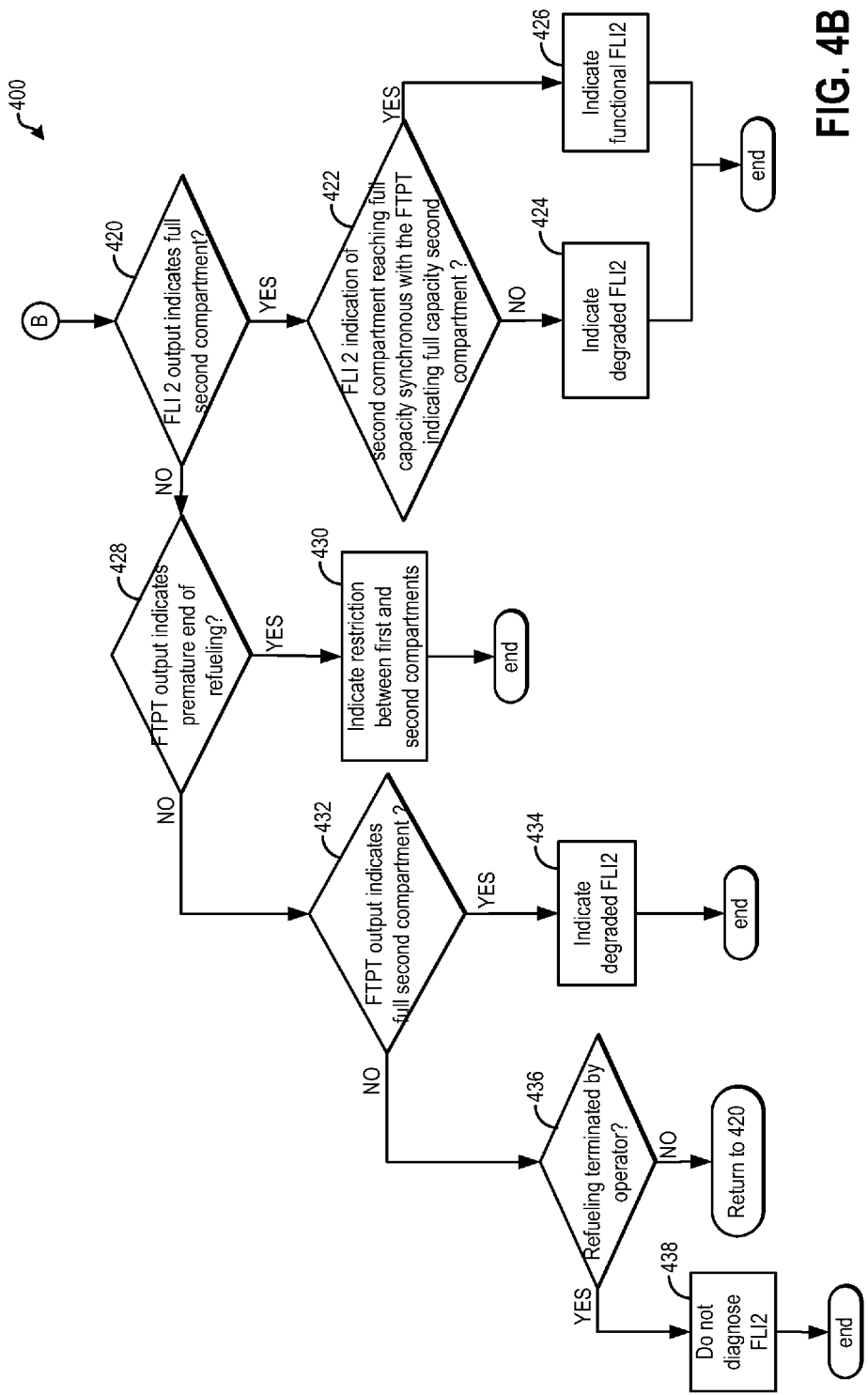

DEGRADED FLI1

DEGRADED FLI2

METHODS AND SYSTEMS FOR FUEL LEVEL INDICATORS IN A SADDLE FUEL TANK

FIELD

The present description relates generally to methods and systems for a fuel system for an internal combustion engine.

BACKGROUND/SUMMARY

Vehicle systems may be equipped with a fuel system including a bifurcated fuel tank for storing and delivering fuel to an internal combustion engine. For example, a fuel tank may include a reserve tank, or the fuel tank may be configured as a saddle tank in order to achieve compact packaging without compromising fuel storage. For example, saddle tanks may be utilized in all wheel drive (AWD) vehicles in which the AWD hardware occupies significant underbody space that is required for packaging a single tank. Further, saddle tanks may be designed to hold more fuel than standard fuel tanks, making them more desirable in vehicle systems that require more fuel storage, such as AWD vehicles.

Bifurcated fuel tanks typically include two compartments, a first, "active" compartment and a second "passive" compartment, that are fluidly coupled. A fuel pump may be coupled to the active compartment, which is maintained at a full capacity by a jet pump that draws fuel from the second compartment to replenish the fuel withdrawn by the fuel pump.

Bifurcated fuel tanks may include a dedicated fuel level indicator, such as a floating sensor, within each of the first and the second compartments, to determine an amount of fuel remaining in the respective compartment. An overall fuel level indicator, such as an in-dash fuel level indicator, may indicate a total amount of fuel to the vehicle operator, which may indicate an average of the outputs of the fuel level indicators in each compartment.

Over time, one or more of the fuel level indicators may become stuck, malfunction, or become decoupled from the vehicle powertrain control module. As a result, the fuel level in one or more compartments may become unknown or not reflective of the actual fuel level within the compartment. As such, the overall fuel level indicator may provide an inaccurate or indeterminate fuel level to the vehicle operator. One common failure associated with fuel level indicators occurs when the fuel tank experiences excessive vacuum levels due to leaking purge valves. The excess vacuum in the fuel tank can cause an arm of the floating sensor to bend. A bent arm results in the sensor over-estimating the amount of fuel in the tank. This may lead to the vehicle running out of fuel during a trip.

Periodically, diagnostic tests may be performed on the fuel level indicators included within the compartments of a saddle tank. One example approach for diagnosing fuel level indicators in saddle tanks is shown by Sweppy et al. in US 2014/0260576. Therein, engine vacuum or a vacuum pump is utilized to reduce an initial fuel tank pressure to a reference pressure, and a time taken to reach the reference pressure is utilized to determine a rate of pressure change. A fuel fill level is then inferred based on the rate of pressure change. For example, a high level of fuel in the tank is inferred when the rate of pressure change is high. The inferred fuel level is then compared to a status (e.g., high, low, etc.) of the fuel level indicator.

However, the inventors herein have identified potential issues with such an approach. As an example, any leak in the fuel system may alter the rate of pressure change. Therefore, the rate of pressure change responsive to an applied vacuum does not always correlate with actual fuel levels. This leads to inaccurate diagnosis of the fuel level indicators. For example, fuel system leaks may decrease the rate of pressure change. As a result, a lower fuel level than the actual fuel level may be inferred. Under such conditions, since the indicator status does not correlate with the inferred fuel level, the fuel level indicator is diagnosed to be degraded even if it indicates the actual fuel level. Further, in order to obtain diagnosis of the entire range of fuel level indicator output, Sweppy's method may require monitoring output of the fuel level indicator over a duration (e.g., period of 100 miles) of engine combustion. Consequently, the diagnosis may take a long time to complete, particularly in hybrid-electric vehicles, or other vehicles configured to operate for extended periods with little or no fuel expenditure. Additionally, fuel sloshing may occur during sharp vehicle maneuvers, resulting in fuel transfer between compartments, and generating a fuel vapor pressure spike. During an evaporative emissions leak test, fuel sloshing may result in an incorrect diagnosis. This is often mitigated by aborting such tests responsive to a deviation in indicated fuel level. However, in saddle tanks, the overall fuel level does not change during a fuel sloshing event. Thus the accuracy of both fuel level indicators is needed to ensure the robustness of evaporative emissions leak tests.

In one example, the above issues may be addressed by a method for an engine, comprising: indicating degradation of one or more of a first fuel level indicator coupled to a first compartment of a fuel tank and a second fuel level indicator coupled to a second compartment of the fuel tank based on a deviation of a fuel tank pressure from a steady state pressure during a refueling event; and indicating a fuel tank level based on the fuel tank pressure responsive to the degradation. By diagnosing fuel level indicators during refueling, noise factors, such as noise due to fuel sloshing, may be reduced. Further, due to the high flow rate of fuel dispensed into the tanks, the pressure changes that occur during refueling are large. Consequently, the pressure changes are robust to other fuel system deficiencies such as a fuel system leak, for example. Hence, faster and more accurate fuel level indicator diagnosis may be obtained.

As an example, a timing of a first fuel tank pressure spike following a first steady state pressure during a refueling event may be utilized to determine when the first compartment reaches full capacity. The first pressure spike is indicated by a fuel tank pressure sensor due to the fuel spilling over to the second compartment upon the first compartment reaching full capacity. If the first fuel level indicator output indicating that the first compartment has reached full capacity is asynchronous from the first pressure spike, degradation of the first fuel level indicator is indicated. For example, the first fuel level indicator may indicate full capacity prior to the pressure spike when the fuel indicator has a bent float arm.

Further, a deviation from a second steady state pressure may be utilized to determine when the second compartment reaches full capacity. Following the first pressure spike, as the fuel is being transferred from the first compartment to the second compartment the fuel tank is maintained at a second steady state pressure. Upon the second compartment reaching full capacity, a deviation from the second steady state pressure is indicated by fuel tank pressure sensor. If the second fuel level indicator output indicating that the second compartment has reached full capacity is asynchronous from the deviation from the second steady state pressure indicated by the pressure sensor, degradation of the second fuel level indicator is inferred. For example, the second fuel level indicator may indicate full capacity prior to the change in the second steady state pressure when the fuel indicator has a bent float arm.

In this way, by correlating the timing of the fuel level indicator outputs reaching full capacities with the deviations from the steady state pressures occurring during refueling of saddle tanks, both fuel indicators may be diagnosed in a single refueling event. As a result, faster diagnostics may be achieved. Further, during refueling, due to the high flow rate of the fuel entering the tank, relatively large pressure changes (such as the pressure spike when the first compartment reaches full capacity and the deviation from the second steady state pressure when the second compartment reaches full capacity) are generated. As a result, the pressure changes can be detected with high accuracy even if there are leaks present in the fuel system. Taken together, by diagnosing one or more fuel level indictors in a saddle tank based on changes in fuel tank pressure during a refueling event, the technical effect of a faster, more complete, and accurate diagnosis may be achieved.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

FIG. 4B is a continuation of flowchart illustrated in FIG. 4A.

DETAILED DESCRIPTION

Figure 1:
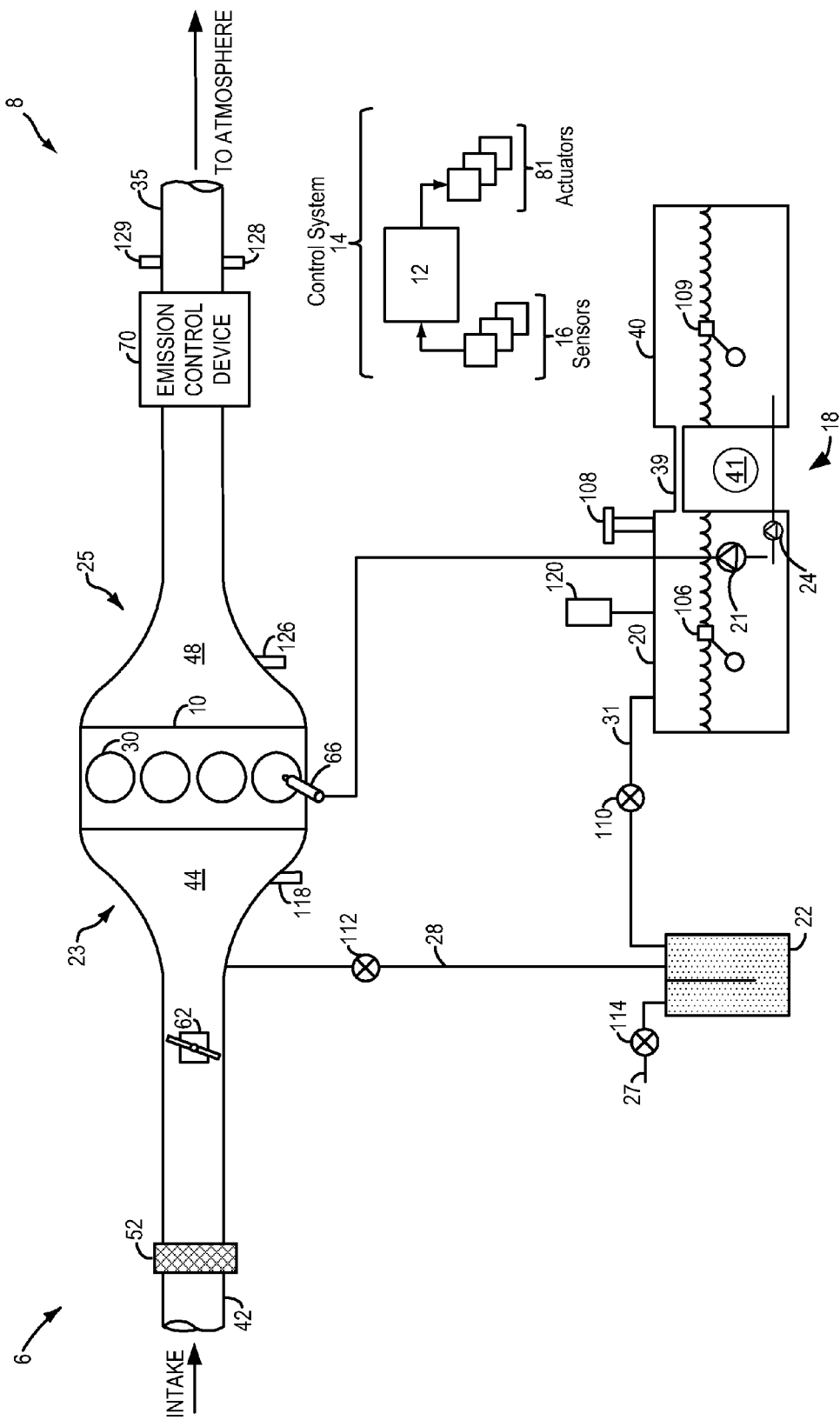
FIG. 1 shows a schematic depiction of a vehicle including an engine and a fuel system having a bifurcated fuel tank including a first compartment and a second compartment.
Figure 3:
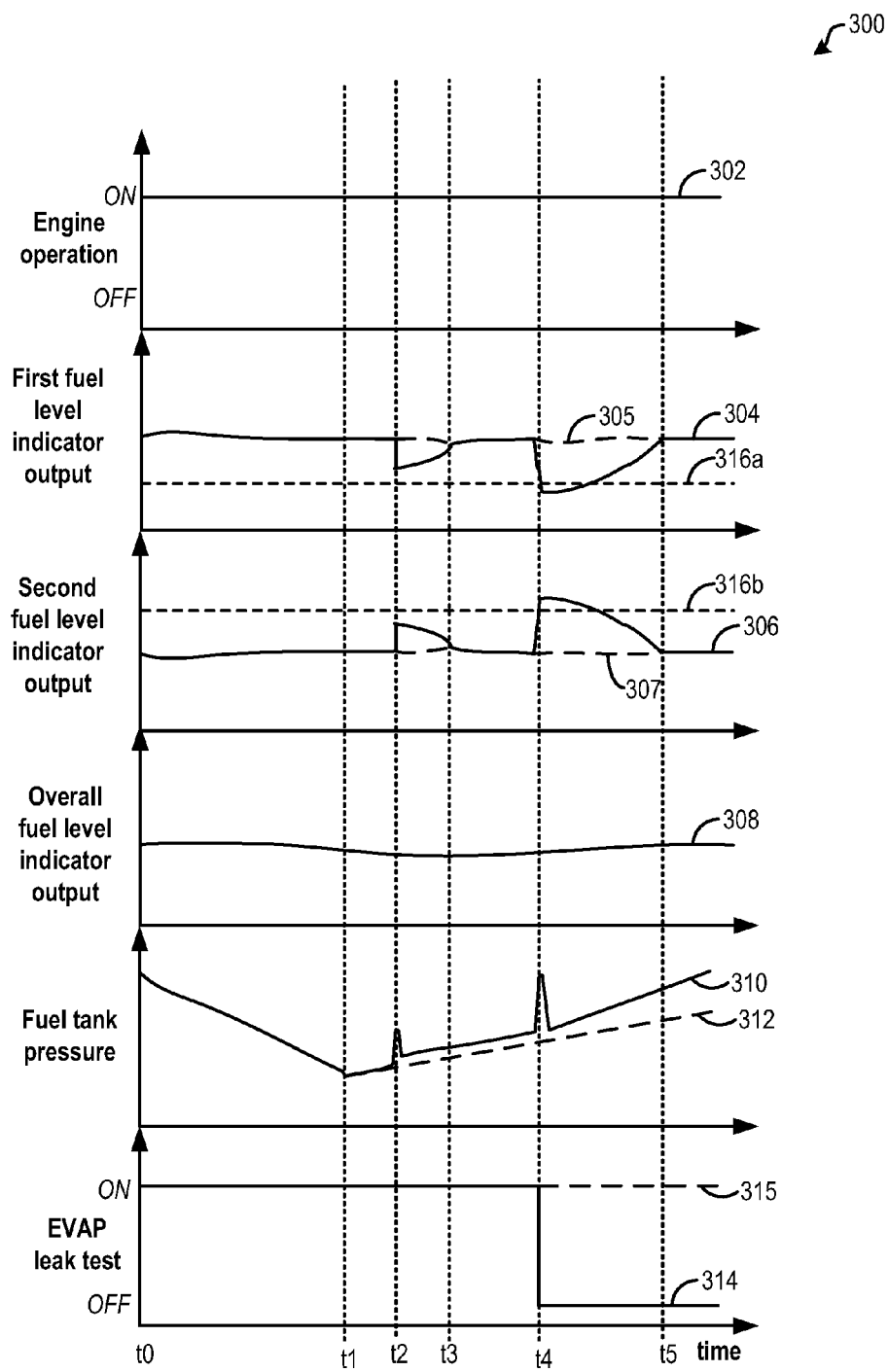
FIG. 3 shows an example timeline for an evaporative emission leak detection test according to the method of FIG. 2.
Figure 4A:
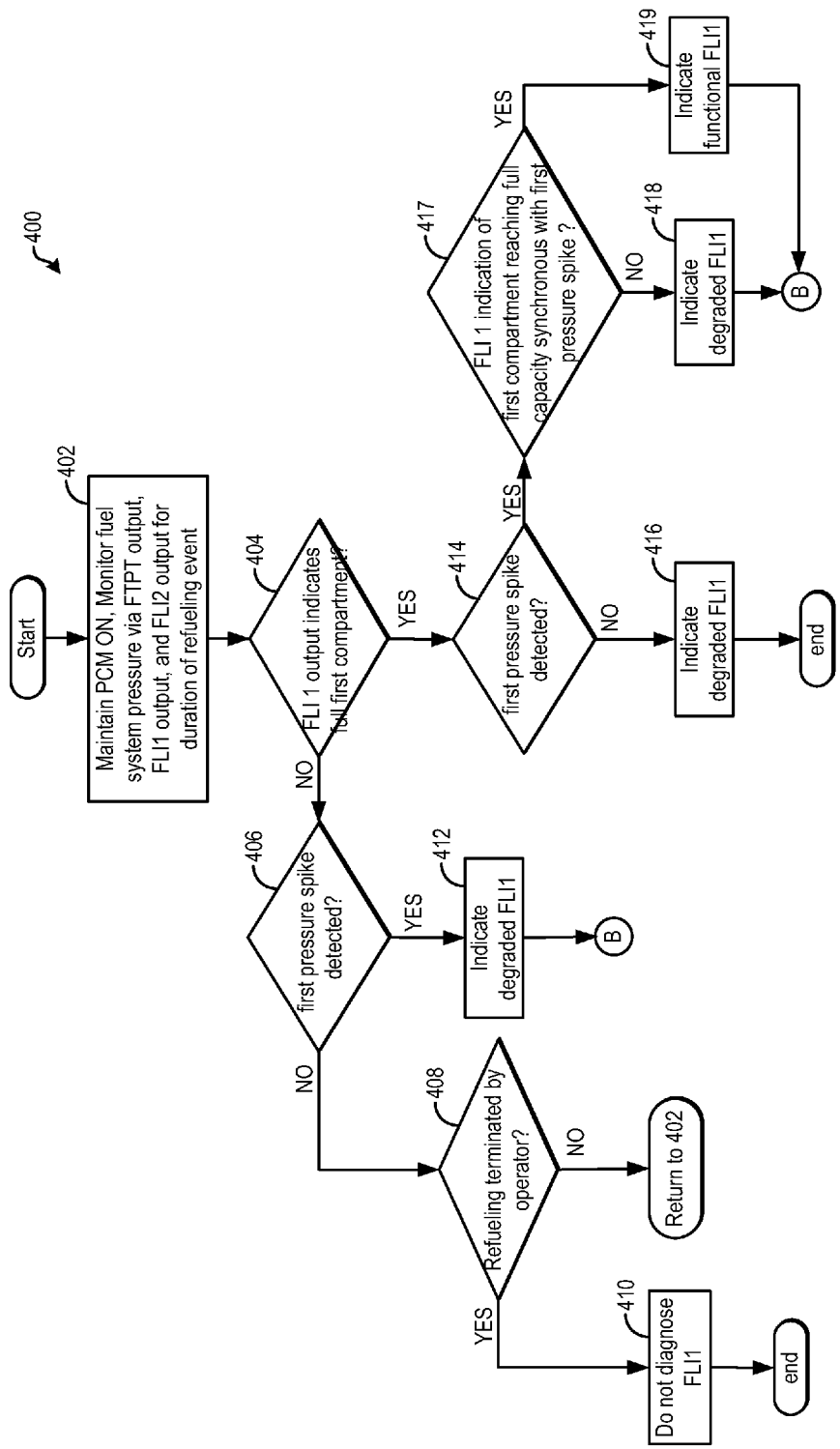
FIG. 4A shows a flowchart illustrating a method for diagnosing a first fuel level indicator coupled to a first compartment and a second fuel level indicator coupled to a second compartment of a fuel tank based on fuel tank pressure during a refueling event.
Figure 5A:
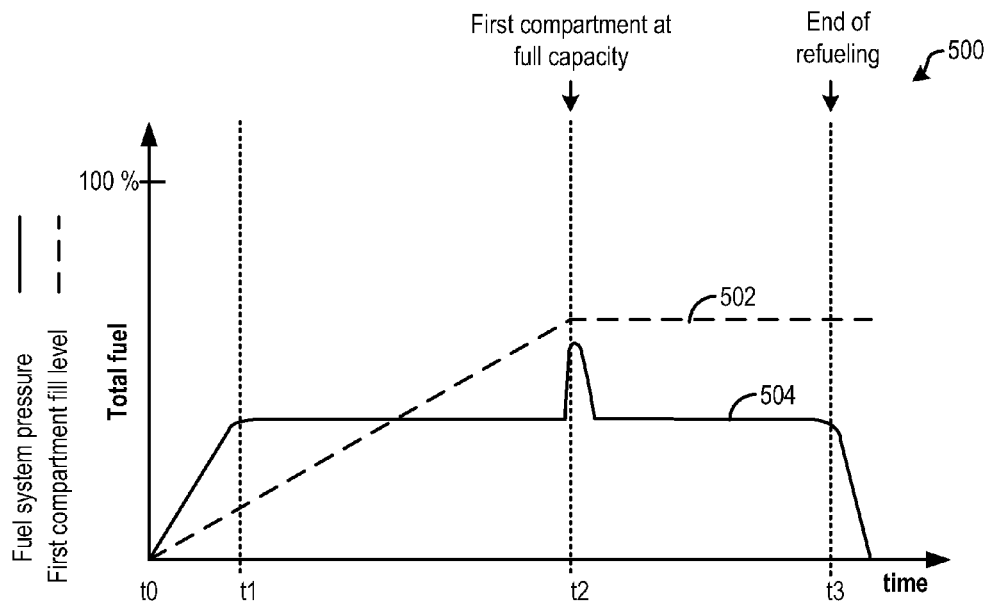
FIG. 5A shows an example timeline for a refueling event for a vehicle comprising a functional first fuel level indicator.
Figure 5B:
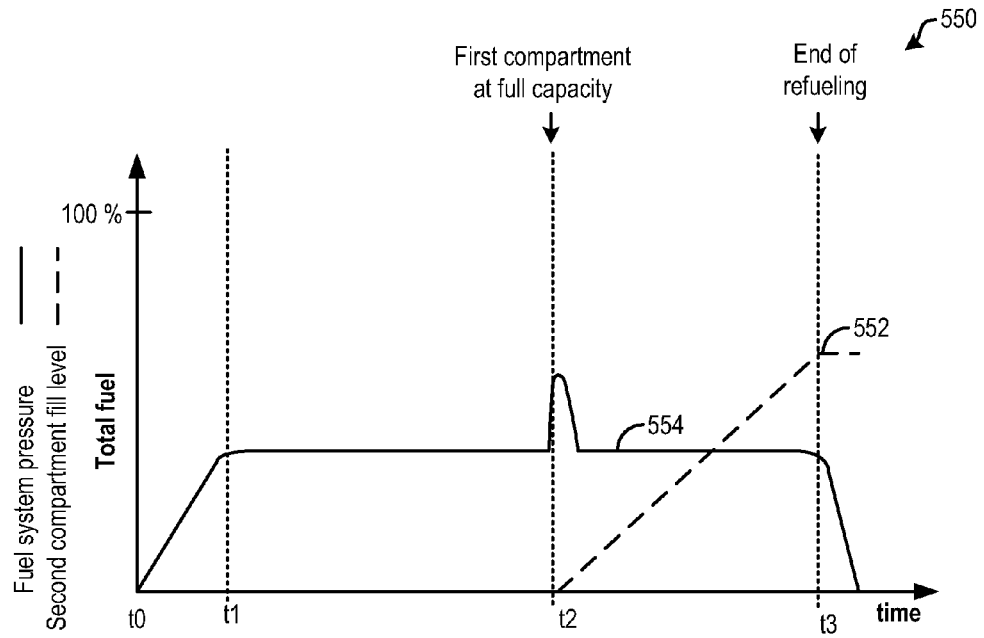
FIG. 5B shows an example timeline for a refueling event for a vehicle comprising a functional second fuel level indicator.
Figure 6A:
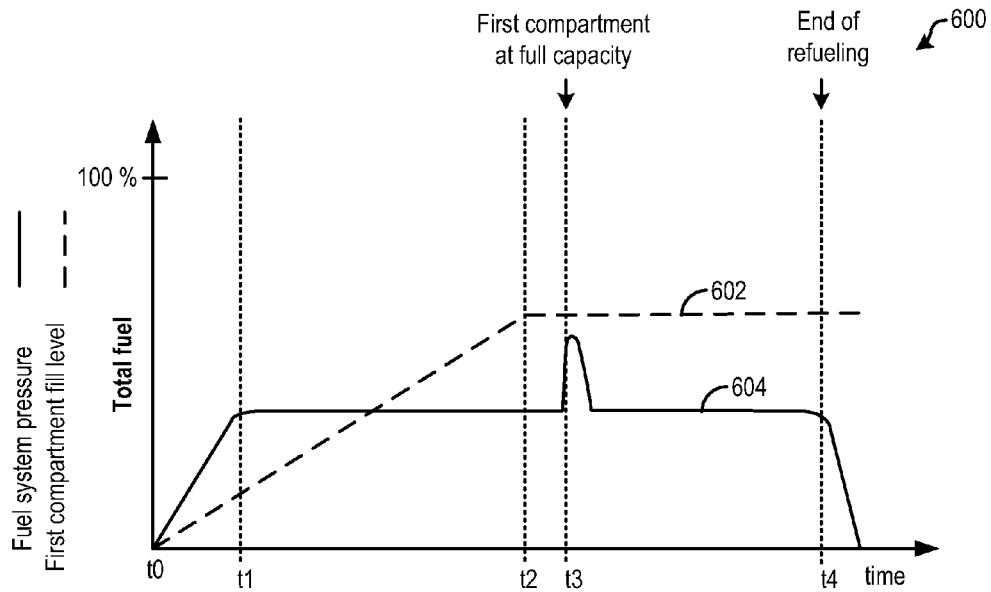
FIG. 6A shows an example timeline for a refueling event for a vehicle comprising a degraded first fuel level indicator.
Figure 6B:
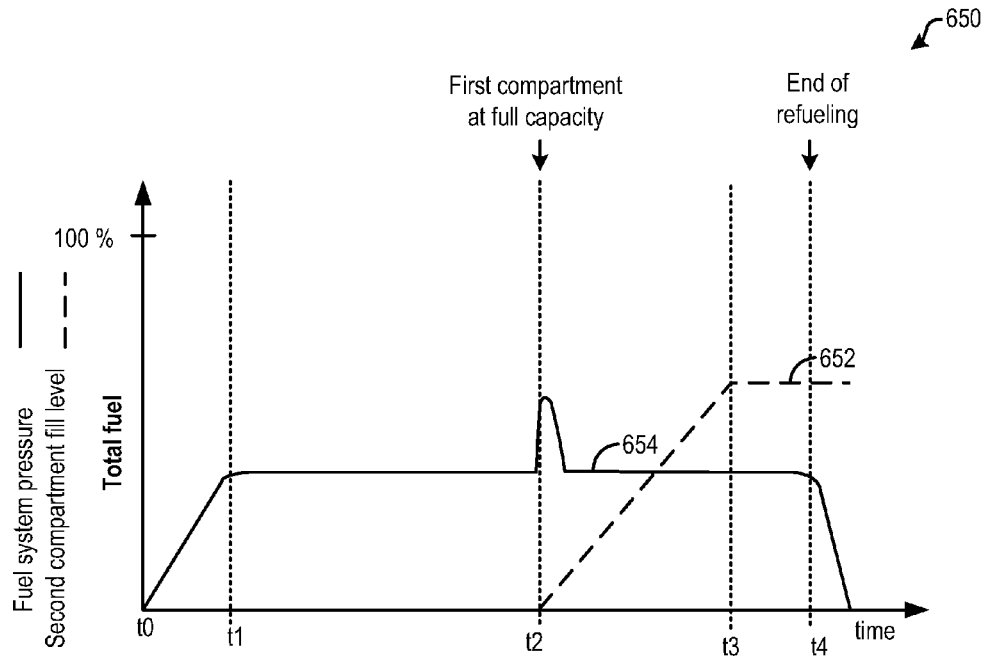
FIG. 6B shows an example timeline for a refueling event for a vehicle comprising a degraded second fuel level indicator.
Figure 7:
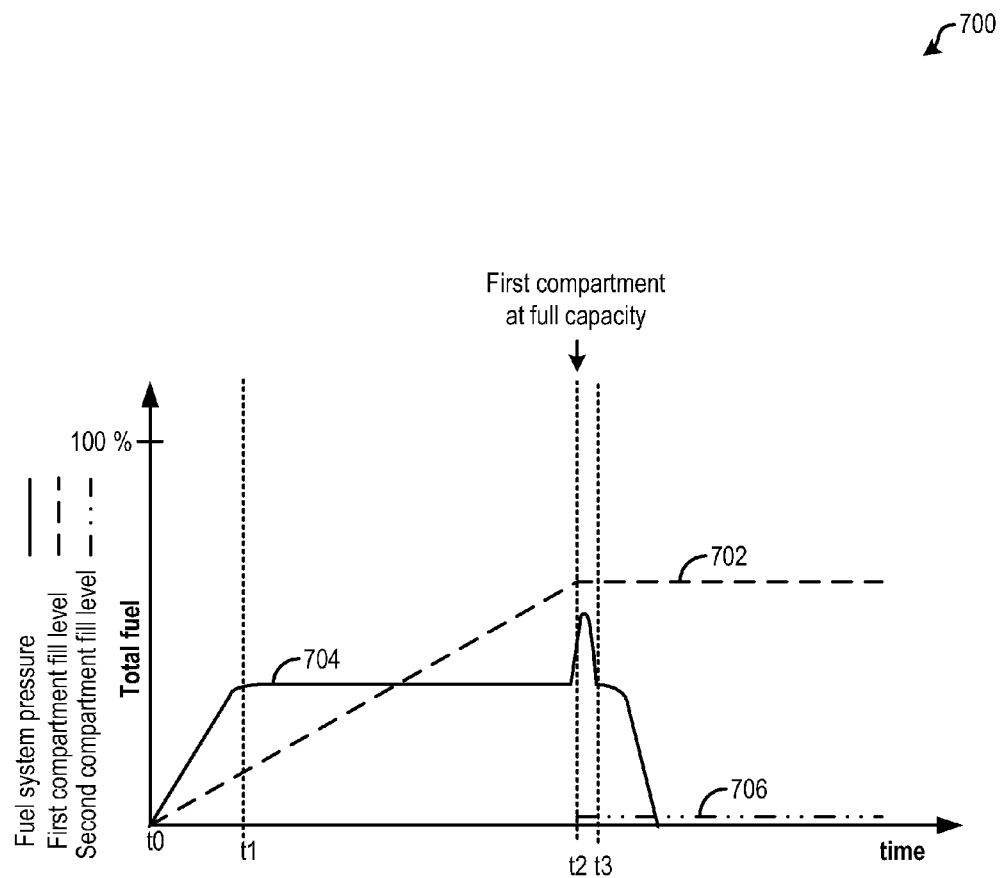
FIG. 7 shows an example timeline for a refueling event for a vehicle with a blockage between the primary tank and the secondary tank.

The following description relates to systems and methods for one or more fuel level indicators in a saddle fuel tank included in a vehicle system, such as the vehicle system of FIG. 1. Specifically, the description involves utilizing an output of a first fuel level indicator and an output of a second fuel level indicator to monitor sudden fuel transfer, such as a fuel transfer due to sharp maneuvering of the vehicle system, between the first and the second compartments of the saddle tank during an EVAP leak test. In response to determining an imminent leak test condition or an ongoing leak test, a controller, such as controller 12 at FIG. 1 may be configured to perform control routines according to the methods of FIG. 2 to monitor for occurrence of sudden fuel transfer and adjust one or more EVAP leak test parameters in response to sudden fuel transfers. An example timeline for adjusting leak test in response to fuel transfer between compartments in the saddle tank is shown at FIG. 3. Further, the description entails diagnosing a first fuel level indicator included in a first compartment of a saddle tank and a second fuel level indicator included in a second compartment of the saddle tank based on changes in fuel tank pressure measured by a fuel tank pressure transducer during a refueling event. FIGS. 4A-4B show an example method that may be stored as executable instructions in a controller, such as controller 12 of FIG. 1 for diagnosing fuel level indicators based on deviations of a fuel tank pressure from steady state pressures during a refueling event. FIGS. 5A and 5B show example timelines for a refueling event for a saddle fuel tank including a functional first fuel level indicator and a functional second fuel level indicator respectively. FIGS. 6A and 6B show example timelines for a refueling event for a saddle fuel tank including a degraded first fuel level indicator and a degraded second fuel level indicator respectively. FIG. 7 shows an example timeline for a refueling event for a saddle tank with a blockage between the first compartment and the second compartment.

FIG. 1 shows a schematic depiction of a vehicle system 6 that can derive propulsion power from engine system 8. Vehicle system 6 may be a conventional vehicle powered solely through combustion, or it may be a hybrid vehicle system that can derive propulsion power from engine system 8 and/or an on-board energy storage device (not shown), such as a battery system. An energy conversion device, such as a generator (not shown), may be operated to absorb energy from vehicle motion and/or engine operation, and then convert the absorbed energy to an energy form suitable for storage by the energy storage device.

Engine system 8 may include an engine 10 having a plurality of cylinders 30. Engine 10 includes an engine intake 23 and an engine exhaust 25. Engine intake 23 includes an air intake throttle 62 fluidly coupled to the engine intake manifold 44 via an intake passage 42. Air may enter intake passage 42 via air filter 52. Engine exhaust 25 includes an exhaust manifold 48 leading to an exhaust passage 35 that routes exhaust gas to the atmosphere. Engine exhaust 25 may include one or more emission control devices 70 mounted in a close-coupled position. The one or more emission control devices may include a three-way catalyst, lean NOx trap, diesel particulate filter, oxidation catalyst, etc. It will be appreciated that other components may be included in the engine such as a variety of valves and sensors, as further elaborated in herein. In some embodiments, wherein engine system 8 is a boosted engine system, the engine system may further include a boosting device, such as a turbocharger (not shown).

Engine system 8 is coupled to a fuel system 18. Fuel system 18 includes a fuel tank 20 coupled to a fuel pump 21 and a fuel vapor canister 22. During a fuel tank refueling event, fuel may be pumped into the vehicle from an external source through refueling port 108. Fuel tank 20 may hold a plurality of fuel blends, including fuel with a range of alcohol concentrations, such as various gasoline-ethanol blends, including E10, E85, gasoline, etc., and combinations thereof. A first fuel level sensor 106 located in fuel tank 20 may provide an indication of the fuel level ("Fuel Level Input") to controller 12. As depicted, fuel level sensor 106 may comprise a float connected to a variable resistor. Alternatively, other types of fuel level sensors may be used.

Fuel tank 20 may be configured as a bifurcated fuel tank, or a fuel tank with two or more separate chambers, wherein each chamber is fluidically coupled to at least one other chamber via a conduit. In this example, secondary fuel tank 40 is shown coupled to fuel tank 20. Fuel tank 20 and secondary fuel tank 40 may be considered a single, saddle fuel tank, which may be configured to be placed over the engine driveline 41. Secondary fuel tank 40 may hold additional fuel that is metered to fuel tank 20 via a jet pump 24. Jet pump 24 may transfer fuel from secondary fuel tank 40 to fuel tank 20, based on a signal received from controller 12, for example. In some examples, jet pump 24 may be configured to constantly replenish fuel withdrawn from fuel tank 20 by fuel pump 21. Jet pump 24 may transfer fuel between fuel tank 20 and secondary fuel tank 40 via a conduit or hose coupled to jet pump 24. Jet pump 24 may have an inlet positioned in secondary fuel tank 40 and an outlet positioned in fuel tank 20. However, under some conditions, jet pump 24 may operate in the reverse direction to transfer fuel from fuel tank 20 to secondary fuel tank 40. Further, in some embodiments, jet pump 24 and fuel pump 21 may be combined into a single pump unit. In some examples, jet pump 24 may be located in secondary fuel tank 40. Jet pump 24 may thus comprise an outlet positioned in secondary fuel tank 40 and an inlet positioned in fuel tank 20 in order to transfer fuel from secondary fuel tank 40 to fuel tank 20.

A conduit 39 may couple fuel tank 20 to secondary fuel tank 40 to allow vapors produced in secondary fuel tank 40 to be routed to canister 22. In some examples, jet pump 24 may transfer fuel between fuel tank 20 and secondary fuel tank 40 via a hose or conduit passing through conduit 39. During sharp vehicle maneuvers or other conditions that may cause fuel sloshing, fuel from fuel tank 20 may flow into secondary tank 40, or vice-versa via conduit 39. Fuel may also flow between fuel tank 20 and secondary tank 40 via conduit 39 when the vehicle is traversing a steep gradient. In some examples, during refueling, upon fuel tank 20 reaching full capacity, fuel may flow from fuel tank 20 into secondary fuel tank 40 via conduit 39. In some examples, jet pump 24 may mediate fuel transfer between fuel tank 20 and secondary fuel tank 40 during refueling events. In some examples, secondary fuel tank 40 may include a refueling port in addition to or as an alternative to refueling port 108. Further, a second fuel level sensor 109 located in fuel tank 40 may provide an indication of the fuel level ("Fuel Level Input") in secondary fuel tank 40 to controller 12. As depicted, fuel level sensor 109 may comprise a float connected to a variable resistor. Alternatively, other types of fuel level sensors may be used. Further, vehicle system 6 may include an overall fuel level indicator (not shown) that indicates an average of an output of first fuel level indicator 106 and second fuel level indicator 109.

Fuel pump 21 is configured to pressurize fuel delivered to the injectors of engine 10, such as example injector 66. While only a single injector 66 is shown, additional injectors are provided for each cylinder. It will be appreciated that fuel system 18 may be a return-less fuel system, a return fuel system, or various other types of fuel system. Vapors generated in fuel tank 20 may be routed to fuel vapor canister 22, via conduit 31, before being purged to the engine intake 23.

Fuel vapor canister 22 may be filled with an appropriate adsorbent for temporarily trapping fuel vapors (including vaporized hydrocarbons) generated during fuel tank refueling operations, as well as diurnal vapors. In one example, the adsorbent used is activated charcoal. When purging conditions are met, such as when the canister is saturated, vapors stored in fuel vapor canister 22 may be purged to engine intake 23 by opening canister purge valve 112. While a single canister 22 is shown, it will be appreciated that fuel system 18 may include any number of canisters.

Canister 22 includes a vent 27 for routing gases out of the canister 22 to the atmosphere when storing, or trapping, fuel vapors from fuel tank 20. Vent 27 may also allow fresh air to be drawn into fuel vapor canister 22 when purging stored fuel vapors to engine intake 23 via purge line 28 and purge valve 112. While this example shows vent 27 communicating with fresh, unheated air, various modifications may also be used. Vent 27 may include a canister vent valve 114 to adjust a flow of air and vapors between canister 22 and the atmosphere. The canister vent valve may also be used for diagnostic routines. When included, the vent valve may be opened during fuel vapor storing operations (for example, during fuel tank refueling and while the engine is not running) so that air, stripped of fuel vapor after having passed through the canister, can be pushed out to the atmosphere. Likewise, during purging operations (for example, during canister regeneration and while the engine is running), the vent valve may be opened to allow a flow of fresh air to strip the fuel vapors stored in the canister.

If vehicle system 6 is a hybrid vehicle, it may have reduced engine operation times due to the vehicle being powered by engine system 8 during some conditions, and by the energy storage device under other conditions. While the reduced engine operation times reduce overall carbon emissions from the vehicle, they may also lead to insufficient purging of fuel vapors from the vehicle's emission control system. To address this, a fuel tank isolation valve 110 may be optionally included in conduit 31 such that fuel tank 20 is coupled to canister 22 via the valve. During regular engine operation, isolation valve 110 may be kept closed to limit the amount of diurnal or "running loss" vapors directed to canister 22 from fuel tank 20. During refueling operations, and selected purging conditions, isolation valve 110 may be temporarily opened, e.g., for a duration, to direct fuel vapors from the fuel tank 20 to canister 22. By opening the valve during purging conditions when the fuel tank pressure is higher than a threshold (e.g., above a mechanical pressure limit of the fuel tank above which the fuel tank and other fuel system components may incur mechanical damage), the refueling vapors may be released into the canister and the fuel tank pressure may be maintained below pressure limits. While the depicted example shows isolation valve 110 positioned along conduit 31, in alternate embodiments, the isolation valve may be mounted on fuel tank 20.

Pressure sensor 120 may be coupled to fuel system 18 for providing an estimate of a fuel system pressure. In one example, the fuel system pressure is a fuel tank pressure, wherein pressure sensor 120 is a fuel tank pressure transducer (FTPT) coupled to fuel tank 20 for estimating a fuel tank pressure or vacuum level. In some examples, a second pressure sensor may be coupled to secondary fuel tank 40 for estimating a fuel tank pressure or vacuum level. While the depicted example shows the pressure sensor directly coupled to fuel tank 20, in alternate embodiments, pressure sensor 120 may be coupled between the fuel tank and canister 22, specifically between the fuel tank and isolation valve 110. In still other embodiments, a first pressure sensor may be positioned upstream of the isolation valve (between the isolation valve and the canister) while a second pressure sensor is positioned downstream of the isolation valve (between the isolation valve and the fuel tank), to provide an estimate of a pressure difference across the valve.

Fuel vapors released from canister 22, for example during a purging operation, may be directed into engine intake manifold 44 via purge line 28. The flow of vapors along purge line 28 may be regulated by canister purge valve 112, coupled between the fuel vapor canister and the engine intake. The quantity and rate of vapors released by the canister purge valve may be determined by the duty cycle of an associated canister purge valve solenoid (not shown). As such, the duty cycle of the canister purge valve solenoid may be determined by the vehicle's powertrain control module (PCM), such as controller 12, responsive to engine operating conditions, including, for example, engine speed-load conditions, an air-fuel ratio, a canister load, etc. By commanding the canister purge valve to be closed, the controller may seal the fuel vapor recovery system from the engine intake. An optional canister check valve (not shown) may be included in purge line 28 to prevent intake manifold pressure from flowing gases in the opposite direction of the purge flow. As such, the check valve may be necessary if the canister purge valve control is not accurately timed or the canister purge valve itself can be forced open by a high intake manifold pressure. An estimate of the manifold absolute pressure (MAP) or manifold vacuum (ManVac) may be obtained from MAP sensor 118 coupled to intake manifold 44 and communicated with controller 12. Alternatively, MAP may be inferred from alternate engine operating conditions, such as mass air flow (MAF), as measured by a MAF sensor (not shown) coupled to the intake manifold.

Fuel system 18 may be operated by controller 12 in a plurality of modes by selective adjustment of the various valves and solenoids. For example, the fuel system may be operated in a fuel vapor storage mode (e.g., during a fuel tank refueling operation and with the engine not running), wherein the controller 12 may open isolation valve 110 while closing canister purge valve (CPV) 112 to direct refueling vapors into canister 22 while preventing fuel vapors from being directed into the intake manifold.

As another example, the fuel system may be operated in a refueling mode (e.g., when fuel tank refueling is requested by a vehicle operator), wherein the controller 12 may open isolation valve 110, while maintaining canister purge valve 112 closed, to depressurize the fuel tank before allowing fuel to be added therein. As such, isolation valve 110 may be kept open during the refueling operation to allow refueling vapors to be stored in the canister. After refueling is completed, the isolation valve may be closed. In one example, during the refueling mode, controller 12 may perform diagnosis of first fuel level sensor 106 and second fuel level sensor 109 based on a fuel tank pressure indicated by pressure sensor 120. Details of performing fuel level sensor diagnostics will be further elaborated with respect to FIGS. 4A-7.

Returning to the discussion on operating modes of the fuel system, as yet another example, the fuel system may be operated in a canister purging mode (e.g., after an emission control device light-off temperature has been attained and with the engine running), wherein the controller 12 may open canister purge valve 112 while closing isolation valve 110. Herein, the vacuum generated by the intake manifold of the operating engine may be used to draw fresh air through vent 27 and through fuel vapor canister 22 to purge the stored fuel vapors into intake manifold 44. In this mode, the purged fuel vapors from the canister are combusted in the engine.

Controller 12 may also be configured to intermittently perform leak detection routines on fuel system 18 to confirm that the fuel system is not degraded. As such, leak detection routines may be performed while the vehicle is running with the engine on (e.g., during an engine mode of hybrid vehicle operation) or with the engine off (e.g., during a battery mode of hybrid vehicle operation). As discussed above, in response to determining degradation of one or more fuel level sensors, engine-on leak detection routines that utilize fuel level sensors to determine sudden fuel transfer (as discussed below with respect to FIGS. 2 and 3) between fuel tank 20 and secondary fuel tank 40 may not be performed.

Vehicle system 6 may further include control system 14. Control system 14 is shown receiving information from a plurality of sensors 16 (various examples of which are described herein) and sending control signals to a plurality of actuators 81 (various examples of which are described herein). As one example, sensors 16 may include exhaust gas sensor 126 located upstream of the emission control device, temperature sensor 128, MAP sensor 118, pressure sensor 129, fuel level sensor 106, fuel level sensor 109, and fuel tank pressure sensor 120. Other sensors such as additional pressure, temperature, air/fuel ratio, and composition sensors may be coupled to various locations in the vehicle system 6. As another example, the actuators may include fuel injector 66, isolation valve 110, purge valve 112, vent valve 114, fuel pump 21, and throttle 62. The control system 14 may include a controller 12. The controller may receive input data from the various sensors, process the input data, and trigger the actuators in response to the processed input data based on instruction or code programmed therein corresponding to one or more routines. For example, controller 12 receives signals from the various sensors of FIG. 1 and employs the various actuators of FIG. 1 to adjust engine operation based on the received signals and instructions stored on a memory of the controller. Example control routines are described herein with regard to FIGS. 2, 4A and 4B.

Figure 2:
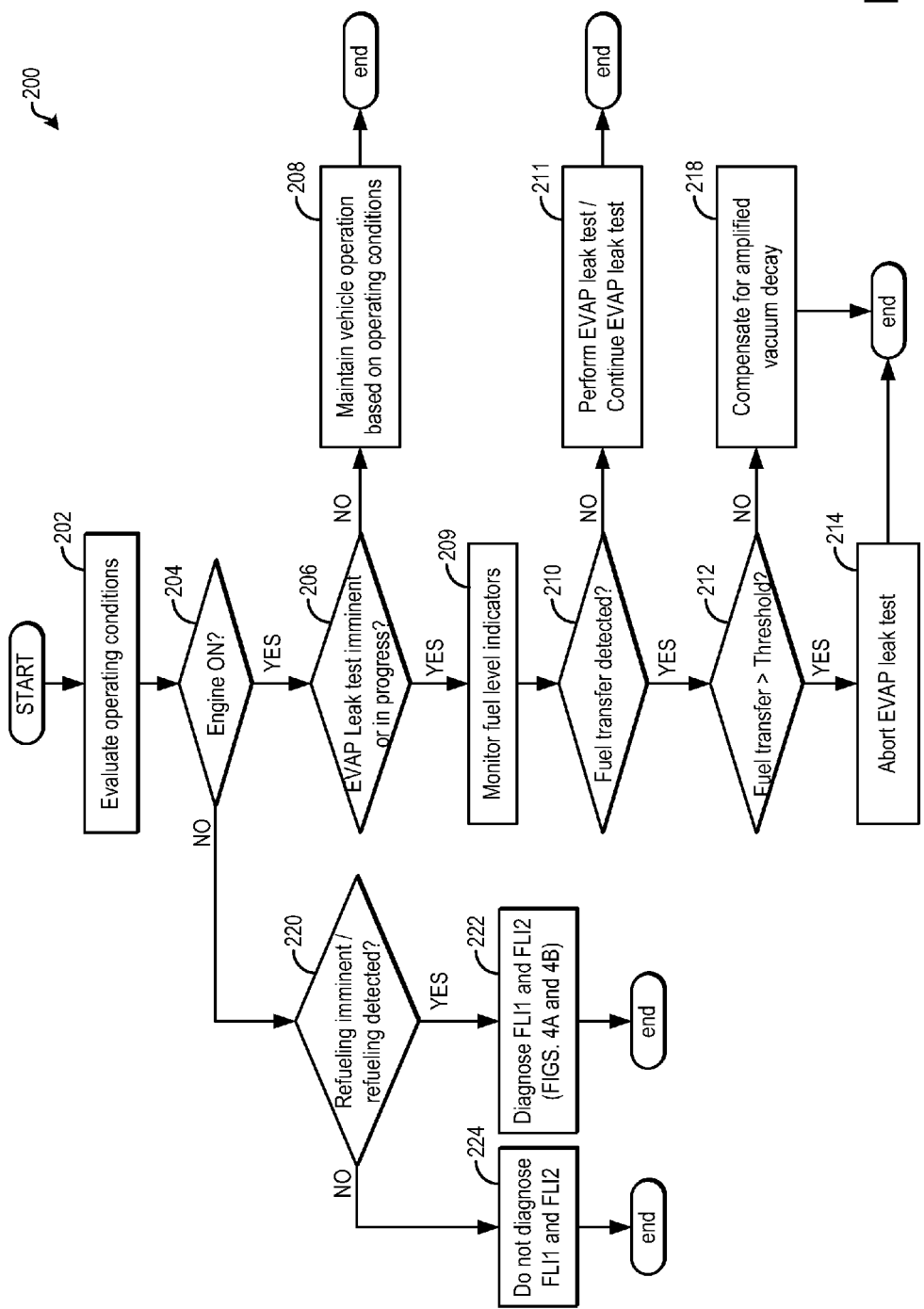
FIG. 2 shows a flowchart illustrating a method for adjusting an evaporative emission leak detection test for a fuel system comprising a bifurcated fuel tank during engine operation.

Referring now to FIG. 2, a flow chart for a high level method 200 for performing diagnostic testing on a fuel system comprising a saddle fuel tank is shown. Specifically, method 200 may adjust an engine-on EVAP leak test based on an output of a first fuel level indicator (such as fuel level sensor 106 shown at FIG. 1) coupled within a first compartment of a saddle fuel tank and an output of a second fuel level indicator (such as fuel level sensor 109 shown at FIG. 1) coupled within a second compartment of the saddle tank. In this example, fuel is withdrawn from the first compartment by a fuel pump and replenished from the second compartment with a jet pump. Method 200 may be stored as executable instructions in non-transitory memory of a controller, such as controller 12 shown in FIG. 1. Method 200 will be described herein with reference to the components and systems depicted in FIG. 1, though it should be understood that the method may be applied to other systems without departing from the scope of this disclosure. Furthermore, performing method 200 may yield the operating sequence shown in FIG. 3.

When a vehicle is in motion, sharp maneuvers resulting in rapid shifts in vehicle momentum may cause the fuel in the vehicle fuel tank to slosh and generate fuel vapors. During an EVAP leak test that checks for leaks in the fuel system, the excess fuel vapors may increase the vacuum bleed up rate, which may cause the evaporative emissions diagnostic monitor to falsely set diagnostic trouble codes. In regular fuel tanks, a fuel level indicator is monitored for pressure spikes that occur during fuel sloshing conditions. However, in a saddle tank including a first compartment and a second compartment, fuel sloshing may result in a sudden fuel transfer between the first and second compartments. Typically, a saddle tank includes a total fuel level indicator that indicates an average of a first fuel level indicator output and a second fuel level indicator output. The total fuel level indicator does not detect the sudden fuel transfer since the total fuel level remains the same. Therefore, in a saddle tank, the first fuel level indicator output and the second fuel level indicator output may be monitored in order to detect the sudden fuel transfers between the first and second compartments.

At 202, method 200 includes evaluating operating conditions. Operating conditions may comprise one or more vehicle conditions, one or more engine conditions, and/or one or more fuel system conditions. For example, operating conditions may include, but are not limited to, fuel tank pressure, fuel tank fill level, ambient temperature, engine operating status, vehicle location (as determined through an on-board GPS, for example), etc. Operating conditions may be measured by one or more sensors coupled to a controller, such as sensors 16 shown coupled to controller 12, or may be estimated or inferred based on available data.

Method 200 proceeds to 204 after evaluating operating conditions. At 204, method 200 includes determining whether the engine is ON. For example, the engine may be determined to be ON if the engine speed is greater than zero.

If it is determined that the engine is ON, method 200 proceeds to 206. At 206 method 200 includes determining if an EVAP leak test is imminent or in progress. For example, an EVAP leak test may be determined to be in progress if a CPV is open and a CVV is closed. Further, an EVAP leak test may be imminent if entry conditions for the leak test are met. Entry conditions for the leak test may include a variety of engine and/or fuel system operating conditions and parameters, such as an intake manifold vacuum level, as well as vehicle conditions, such as an amount of time or distance driven since a prior leak testing. Entry conditions may be further based on a fuel reid vapor pressure (RVP), a fuel temperature, and a fuel tank wall temperature.

If it is determined that an evaporative emission leak test is not imminent or not in progress, method 200 proceeds to 208. At 208, method 200 includes maintaining vehicle operation based on the evaluated operating conditions. Method 200 may then end.

If it is determined that an evaporative emission leak test is imminent or in progress, method 200 proceeds to 209. At 209, method 200 includes monitoring a first fuel level indicator output and a second fuel level indicator output for the duration of the evaporative emission leak test. For example, the first and the second fuel level indicator outputs may be monitored, recorded, and/or stored at controller 12.

Next, at 210, method 200 includes determining whether passive fuel transfer from the first compartment to the second compartment of the saddle tank or vice versa is detected.

Passive fuel transfer may be detected based on the first fuel level indicator output and the second fuel level indicator output. For example, passive fuel transfer from the first compartment to the second compartment may be indicated responsive to the first fuel level indicator output decreasing and the second fuel level indicator output showing a corresponding increase. Similarly, passive fuel transfer from the second compartment to the first compartment may be indicated responsive to the second fuel level indicator output decreasing and the first fuel level indicator output showing a corresponding increase, the increase and decrease having a magnitude greater than expected based on the rate of fuel consumption and corresponding active fuel transfer from the second compartment to the first compartment. Based on the first and second fuel level indicator outputs, an amount of passive fuel transfer may be indicated.

If it is determined that passive fuel transfer has not occurred, method 200 proceeds to 211. At 211, method 200 includes proceeding with an imminent EVAP leak test, or continuing an in-progress EVAP leak test. For example, the EVAP leak test may be performed during engine operation by utilizing engine vacuum to evacuate the evaporative emissions control system to a desired vacuum. Upon achieving the desired vacuum, vacuum bleed up rate (or a pressure increase rate) may be monitored and compared to a threshold rate. If the vacuum bleed up rate (or the pressure increase rate) is greater than the threshold rate, leak may be indicated. Upon performing the leak test, method 200 ends.

If it is determined that passive fuel transfer has occurred between the first compartment and the second compartment of the saddle tank, method 200 proceeds to 212. At 212, method 200 includes determining if an amount of fuel transfer is greater than a threshold amount. The threshold amount may be predetermined, or may be based on operating conditions, such as fuel fill levels, fuel tank pressure, etc. The threshold may be different for conditions where the EVAP leak test is ongoing and conditions where the EVAP leak test is imminent.

If it is determined that the amount of fuel transfer is greater than the threshold amount, method 200 proceeds to 214. At 214, method 200 includes aborting the EVAP leak test. Upon aborting the leak test, method 200 ends. A flag may be set to revisit the test when entry conditions are next met. However, if it is determined that the amount of fuel transfer is less than the threshold amount, one or more parameters of the EVAP leak test may be adjusted in order to account for increased fuel vapors. In one example, a leak test threshold vacuum bleed up rate may be adjusted based on the amount of fuel transfer. For example, as the amount of fuel transfer increases the threshold vacuum bleed up rate (or a threshold rate of pressure increase) may increase in order to account for increased vapors. Upon performing the evaporative leak test with adjusted parameters, method 200 ends.

In some examples, when the amount of fuel transfer is less than the threshold, one or more parameters of the leak test may be adjusted based on the amount of fuel transfer, a fuel RVP, and a difference between a fuel temperature and a fuel tank wall temperature. For example, if a small amount of cold, high RVP fuel strikes a hot fuel tank wall, the fuel may volatize resulting in an increase in fuel tank pressure. Therefore, in response to determining fuel transfer less than the threshold, when an estimated fuel tank pressure increase is greater than a threshold increase, the EVAP leak test may be aborted, where the estimated fuel tank pressure increase is based on the amount of fuel transfer, a fuel RVP, and a difference between a fuel temperature and a fuel tank wall temperature of the fuel tank receiving the fuel. However, in response to determining fuel transfer less than the threshold, if the estimated fuel tank pressure increase is less than a threshold increase, one or more parameters of the EVAP leak test may be compensated based on the estimated fuel tank pressure increase, In this way, false failures of EVAP leak tests due to fuel sloshing that does not affect the overall fuel level may be reduced.

Returning to 204, if it is determined that the engine is not ON, method 200 proceeds to 220. At 220, method 200 includes determining whether a refueling event is imminent. Determining whether a refueling event is imminent may include detecting a refueling request. For example, a hybrid vehicle may comprise a refueling request button located on the vehicle dashboard. Detecting depression of the refueling request button may indicate that a refueling event is imminent. In other examples, determining whether a refueling event is imminent may include detecting proximity to a refueling station. For example, the vehicle's proximity to a refueling station may be determined via an on-board GPS or through wireless communication between the vehicle and a refueling pump. In another example, the vehicle operator may request directions to a refueling station via the on-board GPS. In still other examples, a refueling event may be inferred by the vehicle operator (or a refueling attendant) opening a refueling door, attempting to remove a fuel cap, or otherwise attempting to gain access to a refueling port, such as refueling port 108.

If it is determined that a refueling request is imminent, method 200 proceeds to 222. At 222, method 200 includes diagnosing the first fuel level indicator (FLI1) coupled to the first compartment of the saddle fuel tank and the second fuel level indicator (FLI2) coupled to the second compartment of the saddle fuel tank during the refueling event. The diagnosis of the first and the second fuel level indicators during the refueling event may be based on a fuel tank pressure indicated by a fuel tank pressure transducer (FTPT) (such as fuel tank pressure sensor 120 shown at FIG. 1) coupled to the first compartment of the fuel tank. Details of diagnosing the first and the second fuel level indicators during the refueling event will be further discussed with respect to FIGS. 4A-4B, 5A-5B, 6A-6B, and 7.

If it is determined at 220 that no refueling request is imminent, method 200 proceeds to 224. At 224, method 200 may include not performing diagnosis of fuel level indicators, and a current fuel system status may be maintained. Method 200 may then end.

Turning now to FIG. 3, it shows an example timeline 300 for adjusting an EVAP leak test based on a first fuel level indictor output and a second fuel level indicator output based on method 200 as described herein with reference to FIG. 2. This example demonstrates how a sudden fuel transfer results in adjusting a leak test parameter or aborting the leak test based on a magnitude of fuel transfer.

Timeline 300 of FIG. 3 may be provided by executing instructions in the system of FIG. 1 according to the method of FIG. 2. Vertical markers at times t0-t5 represent times of interest. In all the plots discussed below, the X axis represents time, and time increases from the left side of the plot to the right side of the plot.

Timeline 300 includes plot 302, indicating an engine operating status over time. Timeline 300 further includes plot 304, indicating a first fuel level indicator output over time. Timeline 300 further includes plot 305 (dashed line), indicating the first fuel level indicator output over time in the absence of fuel transfer. Timeline 300 further includes plot 306, indicating a second fuel level indicator output over time. Timeline 300 includes plot 307 (dashed line), indicating the second fuel level indicator output over time in the absence of fuel transfer. Timeline 300 includes plot 308, indicating an overall fuel level indicator output over time. As such, the overall fuel level indicator output is an average of the first fuel level indicator output and the second fuel level indicator output. Timeline 300 further includes plot 310, indicating fuel tank pressure versus time in an emissions control system without a leak. Timeline 300 further includes plot 312 (dashed line), indicating fuel tank pressure versus time in an emissions control system without a leak in the absence of fuel transfer. Time line 300 includes plot 314, indicating an evaporative emission leak test status versus time. Timeline 300 includes plot 315 (dashed line), indicating an evaporative emission leak test status versus time in the absence of fuel transfer. Lines 316a and 316b represent a threshold amount of fuel transfer between the first and second compartments. Together, plots 302, 305, 307, 308, 312, and 315 represent a timeline for a vehicle fuel system where no sudden fuel transfer occurs during the EVAP leak test, while plots 302, 304, 306, 308, 310, and 314 represent a timeline for a vehicle fuel system where sudden fuel transfer occurs twice during the EVAP leak test.

At time t0, an evaporative emission leak test is initiated. The leak test may utilize engine intake vacuum to evacuate the emissions control system by opening a canister purge valve while holding a canister vent valve closed. In some examples, a vacuum pump may be utilized to evacuate the emissions control system. Accordingly, between t0 and t1, as the vacuum is applied, the fuel tank pressure decreases (plot 310). At time t1, when a target vacuum level is reached, the application of vacuum may be stopped, by closing the canister purge valve, or turning off a vacuum pump, for example. Once the application of vacuum has ceased, the fuel system is sealed, and pressure may slowly rise back towards atmospheric pressure as the pressure dissipates through a reference orifice of the fuel system.

At time t2, the vehicle may perform a sharp maneuver (e.g., a sharp turn) which may result in fuel transfer from the first compartment to the second compartment via a conduit (e.g. conduit 39 at FIG. 1) fluidly coupling the first compartment and the second compartment. Consequently, the first fuel level indicator output decreases (plot 304) and the second fuel level indicator output (plot 306) increases. However, the overall fuel level indicator (plot 308), which indicates an average of the first fuel level indicator output and the second fuel level indicator output remains the same. In some examples, fuel transfer from the second compartment to the first compartment resulting from vehicle maneuvers may be detected based on a rate of change in fuel level indicator outputs greater than threshold in order to distinguish between the sudden fuel transfer due to sharp maneuvers and the steady fuel transfer at a constant flow rate via the jet pump.

Further, at t2, due to the sudden fuel transfer, a spike in fuel tank pressure is detected (plot 310). The amount of fuel transfer is less than the threshold amount indicated by lines 316a and 316b. Therefore, the EVAP leak test is not aborted. However, in order to compensate for the increased fuel vapor generation from the sudden fuel transfer, one or more leak test parameters may be adjusted. For example, a leak test threshold, such as a threshold rate of pressure increase (or a threshold rate of vacuum decay) may be adjusted. By adjusting the threshold rate of pressure increase (or the threshold rate of vacuum decay) when fuel transfer below a threshold amount is detected, false setting of diagnostic trouble codes due to increased vapor generation resulting from fuel transfer may be reduced. Consequently, leak diagnosis may be performed with increased accuracy. In contrast, for the vehicle where no sudden fuel transfer occurs at time t1 (see plots 305 and 307), the leak test parameters are not adjusted.

In some examples, a determination by the controller to compensate or abort a leak test may be based on the amount of fuel transfer, a fuel RVP, and a difference between a fuel temperature and a fuel tank wall temperature of the fuel tank receiving the fuel. For example, an estimated fuel vapor increase may be determined based on the amount of fuel transfer, the fuel RVP and the difference. If the estimated increase is greater than a threshold, the EVAP leak test may be aborted even though the amount of fuel transfer is less than the threshold.

Between t2 and t3, the jet pump may deliver fuel to the first compartment at a constant flow rate in order to maintain a desired fuel level (which may be a maximum fill level) in the first compartment. Consequently, the first fuel level indicator output increases gradually and the second fuel level indicator output decreases gradually (plots 304 and 306). In one example, the jet pump may deliver fuel from the second compartment to the first compartment via a hose different from a passive conduit coupling the two compartments (such as conduit 39 at FIG. 1). As such, fuel may transfer via conduit 39 during a fuel transfer event resulting from vehicle maneuvers, as discussed above. Further, fuel may transfer from the first compartment to the second compartment via conduit 39 during a refueling event. For the vehicle where no sudden fuel transfer occurred at time t1, the jet pump may continue to replenish fuel in the first compartment at the rate it is withdrawn by the fuel pump.

At t3, the fuel level in the first compartment may reach the desired level. Between t3 and t4, sudden fuel transfers may not be detected. However, in order to compensate for the fuel vapors generated during the fuel transfer at t2, between t2 and t4, the leak test is performed with compensation (e.g., by adjusting one or more leak test parameters, such as the threshold rate of pressure increase).

At t4, a second fuel transfer from the first compartment to the second compartment may occur. The fuel transfer is detected based on a second decrease in the first fuel level indicator output and a second increase in the second fuel level indicator output. The second fuel transfer amount is greater than the threshold fuel transfer amount indicated by lines 316a and 316b. Consequently, at t4, the ongoing leak test is aborted in order to preempt false setting of diagnostic trouble codes that may occur as a result of increased vapor generation during the transfer. Subsequently, between t4 and t5, the jet pump may deliver fuel from the second compartment to the first compartment in order to maintain the desired fuel level in the first compartment. In contrast, for the vehicle where no sudden fuel transfer occurs at time t4 (see plots 305 and 307), the leak test is not aborted, as shown by plot 315.

In this way, in response to detecting sudden fuel transfer between the first compartment and second compartment of the saddle fuel tank based on the first and second fuel level indicator outputs during an engine-on EVAP leak test, one or more leak test parameters may be adjusted if the fuel transfer amount is less than the threshold amount. If the fuel transfer amount is greater than the threshold, the leak test may be aborted. By adjusting the leak test (by compensation or termination based on the fuel transfer amount), more accurate evaporative emission leak diagnostics may be performed.

FIGS. 4A and 4B show a method 400 for diagnosing a first fuel level indicator (e.g., fuel level indicator 106 at FIG. 1) included in a first compartment (e.g., fuel tank 20 at FIG. 1) of a saddle tank and a second fuel level indicator (e.g., fuel level indicator 109 at FIG. 1) included in a second compartment (e.g., secondary tank 40) of the saddle tank during a refueling event based on a fuel tank pressure transducer output. In this example, the first compartment is coupled to a refueling port (e.g., refueling port 108), while the second compartment is filled by runoff from the first compartment (e.g., via conduit 39). Method 400 may be stored as executable instructions in non-transitory memory of a controller, such as controller 12 shown in FIG. 1. Method 400 will be described herein with reference to the components and systems depicted in FIG. 1, though it should be understood that the method may be applied to other systems without departing from the scope of this disclosure. Method 400 may be performed in response to detecting a refueling event or upon determining that a refueling event is imminent as described with regard to blocks 220 and 222 of method 200. In some examples, method 400 may only be performed when a fuel tank level is below a threshold level at the start of the refueling event. In other words, if the fuel tank level is above a threshold level at the start of the refueling event, diagnosis of the first and the second fuel level indicators may not be performed.

Method 400 begins at 402. At 402, method 400 includes maintaining the controller on and monitoring a fuel tank pressure for the duration of the refueling event. For example, an output of a fuel tank pressure transducer (e.g., FTPT 120 at FIG. 1) coupled to the first compartment may be monitored, recorded, and/or stored at a controller. Further, at 402, method 400 may include, monitoring a first fuel level indicator output (herein also referred to as FLI1 output), and monitoring a second fuel level indicator output (herein also referred to as FLI2 output) as described with regard to FIG. 2 for the duration of the refueling event. Further, monitoring the first fuel level indicator output and the second fuel level indicator output may include monitoring time points when the first and the second fuel level indicator outputs indicate a full first compartment and a full second compartment respectively. Still further, during the refueling event, a jet pump (e.g., pump 24 at FIG. 1) for transferring fuel between the two compartments of the saddle tank may be turned off.

Next, at 404, method 400 includes determining if the FLI1 output indicates that the first compartment is full (e.g., at a predetermined maximum fill level). If it is determined that the FLI1 output indicates a full first compartment, method 400 proceeds to 414. If it is determined that the FLI1 output does not indicate a full first compartment, method 400 proceeds to 406.

At 406, method 400 includes determining if a first pressure spike is indicated by the FTPT sensor during the refueling event. For example, at the start of the refueling event, the second compartment may be empty, and the first compartment may receive fuel from the fuel dispenser via a fuel filler pipe. If fuel is being dispensed into the first compartment at a constant rate, a steady-state pressure will develop in the fuel tank proportional to the fuel dispensation rate. As the refueling progresses, a fuel level in the first compartment increases. Upon the first compartment reaching a threshold fuel level, fuel spills over from the first compartment to the second compartment (via conduit 39 at FIG. 1, for example). As the fuel from the first compartment hits the empty second compartment, a first pressure spike is indicated by the FTPT sensor coupled to the first compartment. If the fuel continues to be dispensed following the first pressure spike, this may indicate that the first compartment has reached its full capacity and passive fuel transfer from the first compartment to the second compartment has been initiated. Thus, the first pressure spike should correlate with a timing of FLI1 indicating the first compartment is full. Therefore, at 406, if it is confirmed that a first pressure spike occurred while the output of FLI1 indicates the first compartment is less than full, it may be inferred that the pressure spike has occurred prior to the FLI1 output indicting full first compartment, and thus degradation of the FLI1 may be inferred. Specifically, the indication of the first pressure spike prior to the FLI1 output indicating the first compartment reaching full capacity indicates that the FLI1 may be stuck. For example, when FLI1 degradation results in a stuck condition of the FLI1, the FLI1 output may reach a maximum output that is less than a full tank output. The FLI1 output may also reach a maximum output less than a full tank output if the FLI1 arm is bent downwards. Accordingly, upon confirming that the first pressure spike at 406 is indicated prior to the FLI1 output indicating that the first compartment has reached full capacity, method 400 proceeds to 412.

At 412, method 400 includes indicating degradation of the FLI1. FLI1 degradation may be indicated with a diagnostic code stored at controller 12, and may be further indicated at an in-dash console. Further, the degradation of the FLI1 may lead the controller to determine and indicate fuel tank fill level based on fuel tank pressure during refueling events. In some examples, at 412, method 400 may further include indicating stuck float arm of FLI1. Upon indicating degradation of the FLI1, method 400 proceeds to 420 (described with reference to FIG. 4B).

Returning to 406, if the first pressure spike is not detected, it may be inferred that the first compartment has not reached the full capacity. Method 400 then proceeds to 408. At 408, method 400 includes determining if the refueling event has been terminated prior to the first compartment reaching full capacity. For example, refueling may be terminated by the operator dispensing the fuel. Manual termination of refueling, which may include operator initiated termination and/or termination mediated by a fuel dispenser (e.g., a predetermined amount of fuel has been dispensed) may be determined based on a deviation from the steady state pressure of the fuel tank as indicated by the FTPT sensor. If the refueling is terminated prior to the first compartment reaching full capacity, a fuel tank pressure decrease may be observed as some of the residual fuel vapors are adsorbed at the fuel vapor canister, and no pressure spike will be observed indicating the filling of the first compartment. Therefore, if refueling has been terminated prior to the first compartment reaching full capacity, sufficient information for diagnosing FLI1 may not be available.

If it is determined that refueling has not been terminated (e.g., refueling is ongoing), method 400 returns to 402. As discussed above, at 402, method 400 may monitor the FTPT output, the FLI1 output, and the FLI2 output for the duration of the refueling event.

If it is determined that the refueling has been terminated prior to the first compartment reaching full capacity, method 400 proceeds to 410. At 410, method 400 may include maintaining the current fuel system status without performing fuel level indicator diagnosis. In one example, if a fuel level indicator diagnosis is underway, the controller may terminate fuel level indicator diagnosis in response to the determination that the refueling has been terminated prior to the first compartment reaching full capacity. Method 400 may subsequently end.

Returning to 404, if it is determined that the FLI1 indicator indicates that the first compartment is full, method 400 proceeds to 414. At 414, method 400 includes determining if the first pressure spike is detected. The first pressure spike may be determined based on the FTPT output as discussed above with respect to action 406. If the first pressure spike is not detected at 414, it may be inferred that the FLI1 output has indicated first compartment at full capacity prior to the first compartment actually reaching its full capacity. In other words, the FLI1 has over-estimated the fuel level in the first compartment. Fuel level indicators may over-estimate fuel level due to a bent float arm, for example. Accordingly, if the first pressure spike is not detected at 414, method 400 proceeds to 416.

At 416, method 400 may indicate degradation of the FLI1. Indication of degradation of the FLI1 may be performed via a diagnostic code stored at controller 12, and may be further indicated at an in-dash console. In some examples, at 416, method 400 may further include indicating a bent float arm of FLI1. In some examples, a parameter for an EVAP leak test performed during an engine-on condition may be adjusted. Such an example may include method 200, wherein the leak test includes monitoring a fuel transfer between the first compartment and the second compartment based on the first fuel level indicator and the second fuel level indicator. In some examples, a fuel consumption profile may be adjusted. For example, if FLI1 is unreliable, a rate of fuel consumption may be reduced in certain scenarios in order to preserve fuel and prevent fuel from running out unexpectedly. Upon indicating FLI1 degradation, method 400 ends.

If the first pressure spike is detected at 414, method 400 proceeds to 417. At 417, method 400 includes determining if FLI1 indication of the first compartment reaching full capacity is synchronous with the FTPT output indication of the first compartment reaching full capacity. Said another way, it may be determined if a first time point when FLI1 indicates the first compartment reaching full capacity coincides with a second time point when the first pressure spike is detected by the FTPT. A threshold duration may be allowed between the first time point and second time point to allow for differing sensor reaction times. If the answer at 417 is YES, the FLI1 output corresponds to the FTPT output. Accordingly, method 400 proceeds to 419. At 419, method 400 includes indicating a functional FLI1. Upon indicating functional FLI1, method 400 proceeds to 420 (described with reference to FIG. 4B).

If the answer at 417 is NO, the FLI1 output does not correspond to the FTPT output. Method 400 then proceeds to 418. At 418, method 400 includes indicating degradation of the FLI1. As discussed above, degradation of the FLI1 may be indicated via a diagnostic code stored at controller 12, and may be further indicated at an in-dash console. In some examples, as discussed at 416, if FLI1 indication of first compartment reaching full capacity occurs prior to first FTPT pressure spike, a bent float arm of FLI1 may be indicated. In some examples, as discussed at 412, if it is determined that the first FTPT pressure spike is detected while a maximum FLI1 output indicates less than full capacity, a stuck FLI1 may be indicated. Upon indicating degradation of the FLI1, method 400 proceeds to 420.

Turning to FIG. 4B, when degradation of FLI1 has been indicated, method 400 proceeds to 420. At 420, method 400 includes determining if the FLI2 output indicates that the second compartment is full (e.g., at a predetermined maximum fill level). If it is determined that the FLI2 output does not indicate a full second compartment, method 400 proceeds to 428.

At 428, method 400 includes determining if the FTPT output indicates a premature end of refueling. For example, during a refueling event, when the fuel is dispensed at a constant rate, following the first pressure spike that occurs when the first compartment is full, the fuel tank pressure is maintained at a second steady state pressure (proportional to the fuel dispensation rate) as fuel is being transferred from the first compartment to the second compartment. The second steady state pressure is maintained for a duration based on an initial fill level of the second compartment, a total capacity of the second compartment, and the fuel dispensation rate until the second compartment reaches full capacity. If a blockage is present in the conduit connecting the first compartment and the second compartment, the fuel may not be delivered to the second compartment. Consequently, the refueling may be automatically terminated immediately after the first compartment has reached full capacity. As a result, the second steady state pressure may be detected for a very short duration or may not be detected at all. Therefore, if the second steady state pressure duration is less than a threshold duration, it may be determined that a premature end of refueling has occurred. If the FTPT output indicates premature end of refueling, method 400 proceeds to 430. At 430, method 400 includes indicating a restriction between the first and second compartments. In some examples, a partial restriction may be present in the conduit connecting the first compartment and the second compartment. The partial restriction may not result in total blockage of fuel transfer but may result in a decreased rate of fuel transfer from the first compartment to the second compartment. Consequently, it may take a longer duration for the second compartment to fill up. Therefore, if the second steady state pressure duration is greater than an expected duration, a partial restriction may be determined.

If a premature end of refueling is not detected, method 400 proceeds to 432. At 432, method 400 includes determining if the FTPT output indicates a full second compartment. A full second compartment may be determined based on a duration of the second steady state pressure, and a timing when a deviation from the second steady state pressure is indicated by the FTPT sensor. Depending on whether a manual termination or an automatic termination has occurred, the deviation may be a pressure drop or a second pressure spike. If the FTPT output indicates a full second compartment at 432, it may be inferred that an indication of the second compartment reaching full capacity by the FTPT sensor does not coincide with an FLI2 output indication of the second compartment reaching full capacity. For example, FLI2 output may have reached a maximum output which is less than a maximum output when a functional FLI2 output shows full capacity. The FLI2 output may also reach a maximum output less than a full tank output if the FLI2 arm is bent downwards. Consequently, when the FTPT indicates that the second compartment has reached full capacity, the FLI2 output shows that the second compartment is at less than full capacity. Therefore, upon confirming that the FTPT indicates that the second compartment at full capacity while the FLI2 output indicates a less than full second compartment, method 400 proceeds to 434. At 434, method 400 includes indicating degradation of the FLI2. Indicating degradation of the FLI2 may include setting a diagnostic code (e.g., stored at controller 12), and may further include indicating degradation of the FLI2 at an in-dash console. In some examples, a nature of degradation of the FLI2 may be indicated. For example, a stuck FLI2 float arm may be indicated.

If the FTPT output does not indicate a full second compartment, method 400 proceeds to 436. At 436, method 400 includes determining if the refueling is terminated prior to the second compartment reaching full capacity. For example, refueling may be terminated by the operator dispensing the fuel. As discussed above with respect to block 408, manual termination of refueling may be determined based on a deviation from the steady state pressure of the fuel tank as indicated by the FTPT sensor. If the refueling is terminated prior to the second compartment reaching full capacity, no pressure spike will be observed indicating the filling of the second compartment. Further, when the refueling event is terminated prior to the second compartment reaching full capacity, the second steady state duration may be less than an expected second steady state duration for the second compartment to reach full capacity. If the refueling has been terminated prior to the second compartment reaching full capacity, sufficient information for diagnosing FLI2 may not be available. Method 400 then proceeds to 438. At 438, method 400 includes maintaining current fuel system status without performing fuel level indicator diagnosis. In one example, the controller may terminate an ongoing fuel level indictor diagnosis. Method 400 may subsequently end.

Returning to 436, if it is determined that refueling is not terminated (e.g., refueling is ongoing), method 400 returns to 420. As discussed above, at 420, method 400 includes determining if an FLI2 output indicates a full second compartment. If it is determined that the FLI2 indicator indicates a full second compartment, method 400 proceeds to 422. At 422, method 400 includes determining if the FLI2 indication of the second compartment reaching full capacity is synchronous with the FTPT output indication of the second compartment reaching full capacity. Said another way, it may be determined if a third time point when FLI2 indicates that the second compartment as reached full capacity coincides with a fourth time when FTPT output indicates that the second compartment has reached full capacity. A threshold duration may be allowed between the third time point and the fourth time point to allow for differing sensor reaction times. As discussed above with respect to 432, a full second compartment may be determined based on the FTPT output indicating a deviation from the second steady state pressure and a duration of the second steady state pressure. If the FLI2 is functional, the FLI2 output indication of the second compartment reaching full capacity is synchronous with the FTPT output indication of the second compartment reaching full capacity. If the answer at 422 is YES, method 400 proceeds to 426 at which functional FLI2 may be indicated. Upon indicating functional FLI2 at 426, method 400 ends.

If the answer at 422 is NO, the FLI2 output indication of the second compartment reaching full capacity is asynchronous from the FTPT output indication of the second compartment reaching full capacity. Method 400 then proceeds to 424. At 424, method 400 indicates a degraded FLI2. In some examples, if it is determined that FLI2 output indication of the second compartment reaching full capacity occurs prior to the FTPT output indication of the second compartment reaching full capacity, it may be inferred that FLI2 is over-estimating the fuel level in the tank, which may occur when the fuel level indicator has a bent float arm. Accordingly, a bent float arm of the FLI2 may be indicated. In some examples, as discussed at 434, if it is determined that the FTPT output indicates that the secondary compartment is at full capacity while a maximum FLI2 output indicates less than full capacity, a stuck FLI2 may be indicated. Further, as discussed above, indicating degradation of the FLI2 may include setting a diagnostic code stored at controller 12, and may further include indicating degradation of the FLI2 at an in-dash console. Upon indicating degradation of the FLI2 at 424, method 400 ends.

In this way, faster and more complete fuel level indicator diagnostics may be achieved by correlating the timing of the fuel level indicators reaching full capacities with the deviations from the steady state pressures occurring during a refueling event. Further, due to high flow rate of fuel dispensed into the tanks, the pressure changes that occur during the refueling event are relatively large. Consequently, the pressure changes are robust to other fuel system deficiencies such as a fuel system leak, for example. As a result, more accurate diagnostics may be performed.

In some examples, upon detecting degradation of the FLI1 and/or FLI2, one or more parameters of an engine-on EVAP leak test may be adjusted. For example, during an engine-on EVAP leak test, the FLI1 output and the FLI2 output may be utilized to monitor sudden fuel transfer (such as those occurring during sharp vehicle maneuvers) between the first and the second compartments of the fuel tank so as to compensate (by adjusting one or more parameters of the leak test) for increased vapor generation during the fuel transfer. Therefore, if it is determined that FLI1 and/or FLI2 is degraded, fuel transfer during the EVAP leak test may not be detected. Accordingly, in one example, the engine-on EVAP leak test may be delayed until the defects in the degraded fuel level indicator are corrected. In this way, by not performing engine-on EVAP leak test in response to determining degradation of the FLI1 and/or FLI2, false setting of diagnostic trouble codes during the leak test may be preempted. Consequently, more robust evaporative leak emissions monitoring may be conducted.

While the above method illustrates diagnosing one or more fuel level indicators included in the saddle tank during a refueling event, it will be appreciated that the diagnosis may be performed upon completion of a refueling event based on the FTPT, the FLI1, and the FLI2 outputs monitored for the duration of the refueling event.

Turning to FIG. 5A, an example timeline for a refueling event for a vehicle comprising a functional first fuel level indicator is shown. The first fuel level indicator may be included in a first compartment of a saddle fuel tank. FIG. 5A depicts timeline 500. Timeline 500 includes plot 502, indicating a first fuel level indicator output over time. Timeline 500 further includes plot 504, indicating a fuel tank pressure based on an FTPT output over time. The FTPT may be included in the first compartment of the saddle tank.

At time t0, a refueling event begins, as shown by an initial increase in fuel tank pressure at plot 504. Following the initial pressure rise, the fuel tank pressure is maintained at a first steady state pressure between t1 and t2, as shown by plot 504, as fuel is delivered at a constant flow rate (not shown). Further, as the first compartment fills up, the output of the first fuel level indicator increases linearly and continuously, as shown by plot 502. At time t2, the first compartment reaches a maximum fill level. Upon reaching the maximum fill level, fuel starts to spill over to the second compartment of the saddle tank. The transfer of fuel from the first compartment to the empty second compartment causes the fuel to volatize, which generates a first pressure spike at t2, as shown by plot 504. Therefore, the pressure spike at t2 indicates that the first compartment has reached full capacity. Further, for a functional first fuel level indicator in the first compartment, the first fuel level indicator output indicating first compartment reaching a full capacity coincides with the first pressure spike, as shown by plots 502 and 504. That is, if the first fuel level indicator is functional, the first fuel level indicator output indicating that the first compartment has reached a full capacity is synchronous with the FTPT output indicating that the first compartment has reached a full capacity.

Between t2 and t3, following the first pressure spike, the fuel tank pressure is maintained at a second steady state pressure as fuel is transferred from the first compartment to the second compartment at a constant rate. The second steady state pressure may be based on the flow rate of the fuel delivered to the first compartment. Fuel level in the second compartment is monitored by a second fuel level indicator included in the second compartment. Details of changes in the second fuel level indicator output during a refueling event will be shown with respect to FIG. 5B. At t3, refueling ends, as indicated by a decrease in the fuel tank pressure from the second steady state pressure. In some examples, when an automatic refueling termination is triggered in response to the second compartment reaching full capacity, a second pressure spike is generated following the second steady state pressure.

Turning now to FIG. 5B, an example timeline for a refueling event for a vehicle comprising a functional second fuel level indicator is shown. The second fuel level indicator may be included in a second compartment of the saddle fuel tank. FIG. 5B depicts timeline 550. Timeline 550 includes plot 552, indicating a second fuel level indicator output over time. Timeline 500 further includes plot 554, indicating a fuel tank pressure based on a FTPT output over time. The FTPT may be included in the first compartment of the saddle tank.

At time t0, a refueling event begins, as shown by an initial increase in the fuel tank pressure at plot 554. Following the initial pressure rise, the fuel tank pressure is maintained at a first steady state pressure between t1 and t2, as shown by plot 554, as fuel is delivered at a constant flow rate (not shown). Further, between t1 and t2, the first fuel level indicator output increases linearly and continuously (not shown). At time t1, the first compartment reaches a maximum fill level. Upon reaching the maximum fill level, fuel starts to spill over to the second compartment of the saddle tank. The transfer of fuel from the first compartment to the second compartment causes the fuel to volatize, which generates a first pressure spike at t2, as shown by plot 554. Therefore, the pressure spike at t2 indicates that the first compartment has reached full capacity.

Between t2 and t3, following the first pressure spike, the fuel tank pressure is maintained at a second steady state pressure as fuel is transferred from the first compartment to the second compartment at a constant transfer rate. The second steady state pressure may be based on the flow rate of the fuel delivered to the first compartment. Fuel level in the second compartment is monitored by a second fuel level indicator included in the second compartment. During the second steady state, the output of the second fuel level indicator increases linearly and continuously, as shown by plot 552.

At t3, the second compartment reaches a maximum fill level and the refueling ends, as indicated by a decrease in the fuel tank pressure following the second steady state pressure. In some examples, when an automatic refueling shut-off is triggered in response to the second compartment reaching full capacity, a second pressure spike is generated following the second steady state pressure. Further, at t3, the output of the second fuel level indicator indicates that the second compartment has reached full capacity, as shown by plot 552. For a functional second fuel level indicator, the second fuel level indicator output indicating second compartment reaching full capacity is synchronous with the end of refueling indicated by the FTPT, as shown by plots 552 and 554. Said another way, for a functional second fuel level indicator, the second fuel level indicator output indicating that the second compartment has reached full capacity coincides with the FTPT output indicating that the second compartment has reached full capacity.

Next, FIG. 6A shows an example timeline for a refueling event for a vehicle comprising a degraded first fuel level indicator. The first fuel level indicator may be included in a first compartment of a saddle fuel tank. FIG. 6A depicts timeline 600. Timeline 600 includes plot 602, indicating a first fuel level indicator output over time. Timeline 600 further includes plot 604, indicating fuel tank pressure based on a FTPT output over time. The FTPT may be included in the first compartment of the saddle tank.

At time t0, a refueling event begins, as shown by an initial increase in fuel tank pressure at plot 604. Following the initial pressure rise, the fuel tank pressure is maintained at a first steady state pressure between t1 and t2, as shown by plot 604, as fuel is delivered at a constant flow rate (not shown). Further, as the first compartment fills up, during the first steady state (that is, during the duration between t1 and t2), the output of the first fuel level indicator increases linearly and continuously, as shown by plot 602.

At time t2, the first fuel level indicator output indicates that the first compartment has reached full capacity, as shown by plot 602. However, at t2, the first pressure spike that is generated when the first compartment reaches full capacity is not detected and the fuel tank pressure continues to maintain the first steady state pressure indicating that fuel continues to be delivered at the constant flow rate while the first fuel level indicator indicates that the first compartment has reached full capacity. Therefore, based on the time of the first fuel level indicator indicating that the first compartment has reached full capacity occurring prior to the first compartment actually reaching full capacity (determined by the FTPT output), degradation of the first fuel level indicator is diagnosed. Further, as the first fuel level indicator overestimates the fuel level in the first compartment indicating full first compartment prior to the first compartment actually reaching full capacity, the degradation of the first fuel level indicator may be diagnosed as due to a bend in the float arm.

At t3, the first pressure spike is detected indicating that the first compartment of the fuel tank has reached full capacity. Following the first pressure spike, between t3 and t4, the fuel tank pressure is maintained at a second steady state pressure as fuel is transferred from the first compartment to the second compartment at a constant transfer rate. The second steady state pressure may be based on the flow rate of the fuel delivered to the first compartment. Fuel level in the second compartment is monitored by a second fuel level indicator output included in the second compartment (not shown). Details of diagnosing the second fuel level indicator output during refueling will be shown with respect to FIG. 6B. At t4, refueling ends, as indicated by decrease in the fuel tank pressure following the second steady state pressure. As discussed above, in some examples, in response to the second compartment reaching full capacity, a second pressure spike is generated following the second steady state pressure.

FIG. 6B shows an example timeline for a refueling event for a vehicle comprising a degraded second fuel level indicator. The second fuel level indicator may be included in a second compartment of the saddle fuel tank. FIG. 6B depicts timeline 650. Timeline 650 includes plot 652, indicating a second fuel level indicator output over time. Timeline 600 further includes plot 654, indicating fuel tank pressure based on a FTPT output over time. The FTPT may be included in the first compartment of the saddle tank.

At time t0, a refueling event begins, as shown by an initial increase in fuel tank pressure at plot 654. Following the initial pressure rise, the fuel tank pressure is maintained at a first steady state pressure between t1 and t2, as shown by plot 654, as fuel is delivered at a constant flow rate (not shown). Further, as discussed at FIG. 6A, as the first compartment fills up, during the first steady state (that is, during the duration between t1 and t2), the output of the first fuel level indicator increases linearly and continuously (not shown). At time t1, the first compartment reaches a maximum fill level. Upon reaching the maximum fill level, fuel starts to spill over to the second compartment of the saddle tank. The transfer of fuel from the first compartment to the second compartment causes the fuel to volatize, which generates a first pressure spike at t2, as shown by plot 654. Therefore, the pressure spike at t2 indicates that the first compartment has reached full capacity.

Between t2 and t3, following the first pressure spike, the fuel tank pressure is maintained at a second steady state pressure as fuel is transferred from the first compartment to the second compartment at a constant transfer rate. The second steady state pressure may be based on the flow rate of the fuel delivered to the first compartment. Fuel level in the second compartment is monitored by the second fuel level indicator included in the second compartment. During the second steady state (that is, during the duration between t2 and t3), the output of the second fuel level indicator increases linearly and continuously, as shown by plot 652.

At t3, the second fuel level indicator output indicates that the second compartment has reached full capacity. However, at t3, a deviation from the second steady state pressure signaling the end of refueling when the second compartment reaches full capacity is not detected. Further, at t3, the fuel tank pressure continues to remain at the steady state pressure indicating that fuel continues to be transferred to the second compartment while the second fuel level indicator indicates that the second compartment has reached full capacity. Therefore, based on the time of the second fuel level indicator indicating that the second compartment has reached full capacity occurring prior to the second compartment actually reaching full capacity (determined based the on the FTPT output), degradation of the second fuel level indicator is diagnosed. Further, as the second fuel level indicator over-estimates the fuel level in the first compartment indicating full second compartment prior to the second compartment actually reaching full capacity, the degradation of the second fuel level indicator may be diagnosed as due to a bend in the float arm.

Further, at t4, the second compartment reaches a maximum fill level and the refueling ends, as indicated by decrease in the fuel tank pressure following the second steady state pressure. In some examples, when an automatic refueling shut-off is triggered in response to the second compartment reaching full capacity, a second pressure spike is generated following the second steady state pressure.

Turning to FIG. 7, an example timeline for a refueling event in a saddle tank with a restriction between a first compartment and a second compartment of the saddle tank is shown. FIG. 7 depicts timeline 700. Timeline 700 includes plot 702, indicating a first fuel level indicator output over time. Timeline 700 further includes plot 704, indicating a fuel tank pressure based on an FTPT output over time, and includes plot 706, indicating a second fuel level indicator output over time. The FTPT may be included in the first compartment of the saddle tank.

At time t0, a refueling event begins, as shown by an initial increase in fuel tank pressure at plot 704. Following the initial pressure rise, the fuel tank pressure is maintained at a first steady state pressure between t1 and t2, as shown by plot 704, as fuel is delivered at a constant flow rate (not shown). Further, as the first compartment fills up, during the first steady state (that is, during the duration between t1 and t2), the output of the first fuel level indicator increases linearly and continuously, as shown by plot 702. At time t2, the first compartment reaches a maximum fill level. However, due to a restriction between the first and the second compartments, upon reaching the maximum fill level in the first compartment, fuel from the first compartment does not reach the second compartment. Consequently, a premature end of refueling may be triggered at t3. In one example, the premature end of refueling at t3 may be determined based on a duration of a second steady state pressure below a threshold duration. Further, at t3, due to premature end of refueling, fuel level in the second compartment (as indicated by the second fuel level indicator output) is below a threshold level and does not increase after the first pressure spike at t2.

In this way, based on fuel tank pressure changes indicating premature end of refueling, blockage in the saddle tank that prevents flow of fuel from the first compartment to the second compartment may be diagnosed.

The system described herein and with regard to FIG. 1, along with the methods described herein and with regard to FIGS. 2, 4A and 4B may enable one or more systems and one or more methods.

In one example, a method for an engine may comprise indicating degradation of one or more of a first fuel level indicator coupled to a first compartment of a fuel tank and a second fuel level indicator coupled to a second compartment of the fuel tank based on a deviation of a fuel tank pressure from a steady state pressure during a refueling event; and indicating a fuel tank level based on the fuel tank pressure responsive to the degradation. The method may further comprise: indicating degradation of the first fuel level indicator responsive to the fuel tank pressure sensor indicating a start of fuel transfer from the first compartment to the second compartment asynchronously from the first fuel level indicator indicating that the first compartment has reached a full capacity. The method may further comprise: indicating that the first fuel level indicator has a bent float arm responsive to the first fuel level indicator indicating that the first compartment has reached a full capacity prior to the fuel tank pressure sensor indicating the start of fuel transfer from the first compartment to the second compartment. The method may further comprise: indicating that the first fuel level indicator has a stuck float arm responsive to the first fuel level indicator reaching a maximum level less than a full fuel tank when the fuel tank pressure sensor indicates the start of fuel transfer from the first compartment to the second compartment. The method may further comprise: indicating degradation of the second fuel level indicator responsive to the fuel tank pressure sensor indicating that the second compartment has reached a full capacity asynchronously from the second fuel level indicator indicating that the second compartment has reached a full capacity. The method may further comprise: indicating that the second fuel level indicator has a bent float arm responsive to the second fuel level indicator indicating that the second compartment has reached a full capacity prior to the fuel tank pressure sensor indicating that the second compartment has reached a full capacity. The method may further comprise: indicating that the second fuel level indicator has a stuck float arm responsive to the second fuel level indicator reaching a maximum level less than a full fuel tank when the fuel tank pressure sensor indicates that the second compartment has reached a full capacity. The method may further include, wherein the indication of start of fuel transfer by the pressure sensor is based on a first deviation of the fuel tank pressure from a first steady state pressure. The method may further include, wherein the indication that the second compartment has reached a full capacity by the pressure sensor is based on a second deviation of the fuel tank pressure from a second steady state pressure. The method may further comprise: indicating a restriction between the first compartment and the second compartment responsive to the fuel tank pressure sensor indicating a premature end of refueling while the second fuel level indicator indicates a fuel level in the second compartment below a threshold level. The method may further comprise: in response to the indication of degradation of one or more of the first fuel level indicator and the second fuel level indicator, adjusting a parameter for an EVAP leak test performed during an engine-on condition, wherein the leak test includes monitoring a fuel transfer between the first compartment and the second compartment based on the first fuel level indicator and the second fuel level indicator.

In another example, a method for a vehicle fuel system may comprise: during an engine-on condition, adjusting a parameter of an EVAP leak test responsive to a fuel transfer between a first compartment and a second compartment of a saddle fuel tank via a conduit fluidly coupling the first and the second compartments; wherein the fuel transfer is determined based on an output of a first fuel level indicator coupled within the first compartment and an output of a second fuel level indicator coupled within the second compartment; and wherein adjusting a parameter of the EVAP leak test includes adjusting a leak test threshold responsive to a fuel transfer amount less than a threshold. The method may further comprise: aborting the EVAP leak test responsive to a fuel transfer amount greater than the threshold. The method may further comprise: adjusting a parameter of the EVAP leak test responsive to an indication of degradation of one or more of the first fuel level indicator and the second fuel level indicator. The method may further include wherein degradation of one or more of the first fuel level indicator and the second fuel level indicator is determined during a refueling event based on a correlation between a deviation of a fuel tank pressure from a steady state pressure, a first fuel level indicator output, and a second fuel level indicator output.

In another example, a vehicle fuel system may comprise: a first fuel compartment including a fuel pump and a jet pump, the jet pump configured to pump liquid fuel from a second compartment to the first compartment during engine operation; a fuel tank pressure transducer coupled to the first fuel compartment; a first fuel level indicator coupled within the first fuel compartment; a second fuel level indicator coupled within the second fuel compartment; and a controller configured with instructions stored in non-transitory memory, that when executed, cause the controller to: during a first condition, indicate degradation of the first fuel level indicator responsive to an indication of fuel transfer from the first compartment to the second compartment occurring asynchronously from the first fuel level indicator indicating that the first compartment has reached full capacity; and during a second condition, adjust an EVAP leak test threshold responsive to an indication of fuel transfer from the first compartment to the second compartment. The system further includes wherein the first condition includes a refueling event, and wherein the indication of fuel transfer from the first compartment to the second compartment is based on a deviation of a fuel tank pressure from a steady state pressure, the deviation including a pressure spike. The system further includes wherein the second condition includes an ongoing or imminent engine-on EVAP leak test, and wherein the indication of fuel transfer is determined based on a decrease in a first fuel level indicator output and a corresponding increase in a second fuel level indicator output.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A vehicle fuel system, comprising:
   a first fuel compartment including a fuel pump and a jet pump, the jet pump configured to pump liquid fuel from a second compartment to the first compartment during engine operation;
   a fuel tank pressure transducer coupled to the first fuel compartment;
   a first fuel level indicator coupled within the first fuel compartment;
   a second fuel level indicator coupled within the second fuel compartment; and
   a controller configured with instructions stored in non-transitory memory, that when executed, cause the controller to:
      during a first condition, indicate degradation of the first fuel level indicator responsive to an indication of fuel transfer from the first compartment to the second compartment occurring asynchronously from the first fuel level indicator indicating that the first compartment has reached full capacity; and
      during a second condition, adjust an evaporative emissions leak test threshold responsive to an indication of fuel transfer from the first compartment to the second compartment.

2. The system of claim 1, wherein the first condition includes a refueling event, and wherein the indication of fuel transfer from the first compartment to the second compartment is based on a deviation of a fuel tank pressure from a steady state pressure, the deviation including a pressure spike.

3. The system of claim 1, wherein the second condition includes an ongoing or imminent engine-on evaporative emissions leak test, and wherein the indication of fuel transfer is determined based on a decrease in a first fuel level indicator output and a corresponding increase in a second fuel level indicator output.

* * * * *